(12) United States Patent
Dreher

(10) Patent No.: US 7,594,183 B2
(45) Date of Patent: Sep. 22, 2009

(54) CAPTURING A WORKFLOW

(75) Inventor: Brian Scott Dreher, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 10/917,922

(22) Filed: Aug. 12, 2004

(65) Prior Publication Data

US 2006/0036958 A1 Feb. 16, 2006

(51) Int. Cl.
*G06F 3/048* (2006.01)
*G06F 3/03* (2006.01)

(52) U.S. Cl. .............. 715/764; 715/778; 715/779; 715/790; 715/277; 715/210

(58) Field of Classification Search .............. 715/764; 717/109, 134, 138
See application file for complete search history.

(56) References Cited

U.S. PATENT DOCUMENTS

| | | | | |
|---|---|---|---|---|
| 3,703,725 | A | | 11/1972 | Gomersall et al. .............. 444/1 |
| 5,627,764 | A | | 5/1997 | Schutzman et al. ..... 364/514 R |
| 5,630,069 | A | | 5/1997 | Flores et al. .................. 395/207 |
| 5,675,753 | A | * | 10/1997 | Hansen et al. .............. 715/744 |
| 5,734,837 | A | * | 3/1998 | Flores et al. .................. 705/7 |
| 5,774,661 | A | | 6/1998 | Chatterjee et al. ...... 395/200.33 |
| 5,890,130 | A | | 3/1999 | Cox et al. ..................... 705/7 |
| 5,905,496 | A | * | 5/1999 | Lau et al. ..................... 715/835 |
| 5,914,713 | A | * | 6/1999 | Nario et al. .................. 715/744 |
| 6,032,124 | A | | 2/2000 | Saito et al. ..................... 705/9 |
| 6,055,369 | A | * | 4/2000 | Sawahata et al. ............ 717/109 |
| 6,067,531 | A | | 5/2000 | Hoyt et al. .................... 705/35 |
| 6,115,646 | A | | 9/2000 | Fiszman et al. .............. 700/181 |
| 6,223,180 | B1 | * | 4/2001 | Moore et al. ................. 707/100 |
| 6,252,591 | B1 | * | 6/2001 | Dockweiler et al. ......... 715/744 |
| 6,279,009 | B1 | | 8/2001 | Smirnov et al. .............. 707/103 |
| 6,308,188 | B1 | | 10/2001 | Bernardo et al. ............ 707/530 |
| 6,341,341 | B1 | * | 1/2002 | Grummon et al. ........... 711/162 |
| 6,445,774 | B1 | | 9/2002 | Kidder et al. ............... 379/9.03 |
| 6,510,468 | B1 | * | 1/2003 | Hayne ......................... 709/246 |
| 6,571,246 | B1 | | 5/2003 | Anderson et al. ............. 707/10 |
| 6,590,589 | B1 | | 7/2003 | Sluiman et al. .............. 345/751 |
| 6,687,834 | B1 | | 2/2004 | Morales, Jr. et al. ........ 713/201 |
| 6,718,334 | B1 | * | 4/2004 | Han ............................ 707/102 |
| 6,836,780 | B1 | * | 12/2004 | Opitz et al. ............... 707/104.1 |
| 6,904,161 | B1 | * | 6/2005 | Becker et al. ............... 382/128 |
| 6,990,636 | B2 | * | 1/2006 | Beauchamp et al. ........ 715/764 |

(Continued)

OTHER PUBLICATIONS

Ronni T. Marshak, "IBM's Business Modeling Tool, BPR Methodology from the Customer Point of View," Jun. 1995, Workgroup Computing Report vol. 18, No. 6, pp. 3-15.

(Continued)

*Primary Examiner*—Steven B Theriault
(74) *Attorney, Agent, or Firm*—Janet M. Skafar; Terrence J. Carroll; Christine H. Smith

(57) ABSTRACT

Various embodiments of a method, system and computer program product for capturing a workflow are provided. A capture application automatically stores at least a portion of a copied screen of a source application from a clipboard to provide a captured screen. The capture application repeats the automatic storing to provide a set of captured screens. In various embodiments, a document is built based on the set of captured screens.

50 Claims, 33 Drawing Sheets

```
        ┌440   ┌436                           ┌442
    ┌─┬────────┬──────────────────────────────────────────────────────────────┐
    │3│ADB26   │ADB26CS n ------------------ V81A Create Table Space ------------------ 12:30
    │ │Input Values│Command ===>
    │ │Option ===> CS│
    │ │        │CREATE
    │ │Depress Key│
    │ │Enter   │TABLESPACE ===>        (required table space name.  ? to look up)
    │ │        │
    │ │        │IN          ===>       (optional database. default=DSNDB04. ? to look up)
    │ │        │
    │ │        │Like:
    │ │        │Database    ===>       (optional existing database. .? to look up)
    │ │        │Name        ===>       (optional existing table space. ? to look up)
    ├─┼────────┼──────────────────────────────────────────────────────────────┤
    │4│ADB26CS │ADB26CS n ------------------ V81A Create Table Space ------------------ 12:30
    │ │Input Values│Command ===>
    │ │TPADB101│
    │ │    ╲444│CREATE            ┌446
    │ │        │
    │ │        │TABLESPACE ===> │TPADB101│ (required table space name.  ? to look up)
    │ │        │
    │ │        │IN          ===>       (optional database. default=DSNDB04. ? to look up)
    │ │        │
    │ │        │Like:
    │ │        │Database    ===>       (optional existing database. .? to look up)
    │ │        │Name        ===>       (optional existing table space. ? to look up)
    └─┴────────┴──────────────────────────────────────────────────────────────┘
       ╲438
```

U.S. PATENT DOCUMENTS

| | | | | |
|---|---|---|---|---|
| 7,086,032 | B2* | 8/2006 | Nirell et al. | 717/113 |
| 7,124,357 | B1* | 10/2006 | Orr | 715/234 |
| 7,184,967 | B1* | 2/2007 | Mital et al. | 705/8 |
| 7,280,955 | B2* | 10/2007 | Martin | 703/23 |
| 7,289,966 | B2* | 10/2007 | Ouchi | 705/7 |
| 7,296,056 | B2* | 11/2007 | Yaung | 709/205 |
| 2002/0019768 | A1* | 2/2002 | Fredrickson et al. | 705/14 |
| 2002/0174010 | A1* | 11/2002 | Rice, III | 705/14 |
| 2003/0115025 | A1* | 6/2003 | Lee et al. | 703/1 |
| 2003/0172020 | A1* | 9/2003 | Davies et al. | 705/36 |
| 2003/0233374 | A1* | 12/2003 | Spinola et al. | 707/104.1 |
| 2004/0046787 | A1* | 3/2004 | Henry et al. | 345/744 |
| 2005/0137908 | A1* | 6/2005 | Fusari et al. | 705/2 |
| 2005/0172018 | A1* | 8/2005 | Devine et al. | 709/223 |
| 2005/0192854 | A1* | 9/2005 | Ebert et al. | 705/7 |

OTHER PUBLICATIONS

Research Disclosure, Article 452111, "Using a pub/sub engine as time service in a workflow management system," Dec. 2001, pp. 2108-2109.

David M. Geary, "graphic Java Mastering the JFC vol. 1: AWT" 3rd Edition, © 1999 Sun Microsytems, Inc. pp. 668-697.

"Spy Software | Computer Monitoring Software | Free Activity Monitor and Activity Logger download trial . . . ", [online]. © 2004 Deep Software [retrieved on Jun. 15, 2004]. Retrieved from the Internet: <URL: http://www.softactivity.com.

"Activity Logger—Spy software for Parental control | Spyware for Internet usage monitoring," [online]. © 2004 Deep Software, [retrieved on Jun. 15, 2004]. Retrieved from the Internet: <URL: http://www.softactivity.com/spy-software.asp>.

C.K. Prasad, "Developing Imaging Applications using the Java2D[tm], JAI and New ImageIO APIs," [Online]. Jun. 2002, [retrieved on Jun. 22, 2004]. Retrieved from the Internet: <URL: http://accessI.sun.com/techarticles/ImagingApps/JImage.html>.

"FAQ Java Advanced Imaging API," [online], [retrieved on Jun. 22, 2004]. Retrieved from the Internet: <URL: http://java.sun.com/jsp_utils/PrintPage.jsp?url=http%3A%2F%2Fjava.son.com%2Fproducts%2Fjava-media%2Fjai%2FforDevelopers%2Fjaifaq.html>.

The LeBlond Group: Geoffrey T. LeBlond and William B. LeBlond, "Windows 3.1 Power Tools, for Windows 3.0 and 3.1," Apr. 1992, pp. 354-371.

* cited by examiner

| Seq. | Steps | User Input | Verification |
|---|---|---|---|
| | Starting Point | | ```
ADB2 dmin ---------- DB2 Administration Menu 5.1.0 ---------- 12:27
Option ===>
                                                    DB2 System: V81A
                                                    DB2 SQL ID: SYSADM
   1  -  DB2 system catalog                         Userid    : SYSADM
   2  -  Execute SQL statements                     DB2 Rel   : 815
   3  -  DB2 performance queries
   4  -  Change current SQL ID
   5  -  Utility generation using LISTDEFs and TEMPLATEs
   P  -  Change DB2 Admin parameters
   DD -  Distributed DB2 systems
   E  -  Explain
   Z  -  DB2 system administration
   SM -  Space management functions
   W  -  Manage work statement lists
   X  -  Exit DB2 Admin
   CC -  DB2 catalog copy version maintenance Interface to other DB2 products and offerings:

I   DB2I

C   DB2 Object Comparison Tool
   SM  Space Manager
``` |

FIG. 18A

| FIG. 18A |
|---|
| FIG. 18B |
| FIG. 18C |
| FIG. 18D |

FIG. 18

```
ADB22
Input Values
Option ===> 4

Depress Key
  Enter
```

ADB26 min -------- V81A Create/Drop/Label/Comment On Objects ------- 12:29
Option ===>

DB2 System: V81A
                                                     DB2 SQL ID: SYSADM CREATE                                  DROP
  CG  -  Storage group                    DG  -  Storage group
  CD  -  Database                         DD  -  Database
  CS  -  Table space                      DS  -  Table space
  CT  -  Table                            DT  -  Table
  CV  -  View                             DV  -  View
  CL  -  Alias                            DL  -  Alias
  CX  -  Index                            DX  -  Index
  CY  -  Synonym                          DY  -  Synonym
  CA  -  Auxiliary table
  CE  -  Distinct type                    DE  -  Distinct type
  CJ  -  Trigger                          DJ  -  Trigger
  CF  -  Function                         DF  -  Function
  CO  -  Stored procedure                 DO  -  Stored procedure
  CM  -  Materialized table
  CQ  -  Sequence                         DQ  -  Sequence
LABEL
  LT  -  Table/view                     COMMENT (remark)
  LL  -  Alias                            RT  -  Table
  LC  -  Column                           RL  -  Alias
                                          RC  -  Column
                                          RE  -  Distinct type
                                          RF  -  Function
                                          RO  -  Stored procedure
                                          RJ  -  Trigger
                                          RX  -  Index
                                          RQ  -  Sequence

FIG. 18C

| | | |
|---|---|---|
| 3 | ADB26 ─────────── V81A Create Table Space ───────── 12:30<br>Command ===><br><br>CREATE<br><br>TABLESPACE ===>                    (required table space name.  ? to look up)<br><br>IN        ===>                    (optional database. default=DSNDB04. ? to look up)<br><br>Like:<br>Database  ===>                    (optional existing database. ? to look up)<br>Name      ===>                    (optional existing table space. ? to look up) | ADB26<br>Input Values<br>Option ===> CS<br><br>Depress Key<br>Enter |
| 4 | ADB26CS ─────────── V81A Create Table Space ───────── 12:30<br>Command ===><br><br>CREATE<br><br>TABLESPACE ===> TPADB101  (required table space name.  ? to look up)<br><br>IN        ===>                    (optional database. default=DSNDB04. ? to look up)<br><br>Like:<br>Database  ===>                    (optional existing database. ? to look up)<br>Name      ===>                    (optional existing table space. ? to look up) | ADB26CS<br>Input Values<br>TPADB101 |

FIG. 18D

CAPTURING A WORKFLOW

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1.0 Field of the Invention

This invention relates to capturing a workflow.

2.0 Description of the Related Art

A workflow application typically provides a graphical user interface to provide information to a user and to allow the user to make selections and input data. The graphical user interface comprises windows, which are also referred to as screens. Information is input to the screen and another screen is typically provided based on the inputs.

When testing computer software systems, the test sequence is documented to re-test the software and fix software problems. A user, such as a software tester, manually documents the test. For example, to document a test when testing a workflow application that has various screens, the tester manually copies and pastes the screens into an empty document. The tester also manually highlights certain portions of the text, documents the inputs, supplies comments and provides the workflow sequence. Because a workflow application may produce numerous different screens during a test, the process of manually documenting a test sequence is tedious and time consuming, and therefore expensive. In addition, different testers may document the test in different manners, and the documentation may not be standardized.

Therefore, there is a need for a technique to reduce the cost of testing a software application. This technique should also provide a link between the documentation and the application that was tested. In addition, this technique should allow documentation to be standardized for software testing.

SUMMARY OF THE INVENTION

To overcome the limitations in the prior art described above, and to overcome other limitations that will become apparent upon reading and understanding the present specification, various embodiments of a method, system and computer program product for capturing a workflow are provided. In various embodiments, a capture application automatically stores at least a portion of a copied screen of a source application from a clipboard to provide a captured screen. The capture application repeats the automatic storing to provide a set of captured screens.

In some embodiments, the screens are copied from the source application to the clipboard. In various embodiments, the captured screens are sequentially displayed in a viewing area. In another embodiment, a document is created based on the set of captured screens.

In this way, an improved technique for capturing a workflow is provided. In various embodiments, the captured workflow is from a software test and standardized documentation is produced.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to capture a workflow. In various embodiments, a capture application automatically stores at least a portion of a copied screen of a source application from a clipboard to provide a captured screen. The capture application repeats the automatic storing to provide a set of captured screens. In some embodiments, a document is built based on the set of captured screens.

Figure 1:
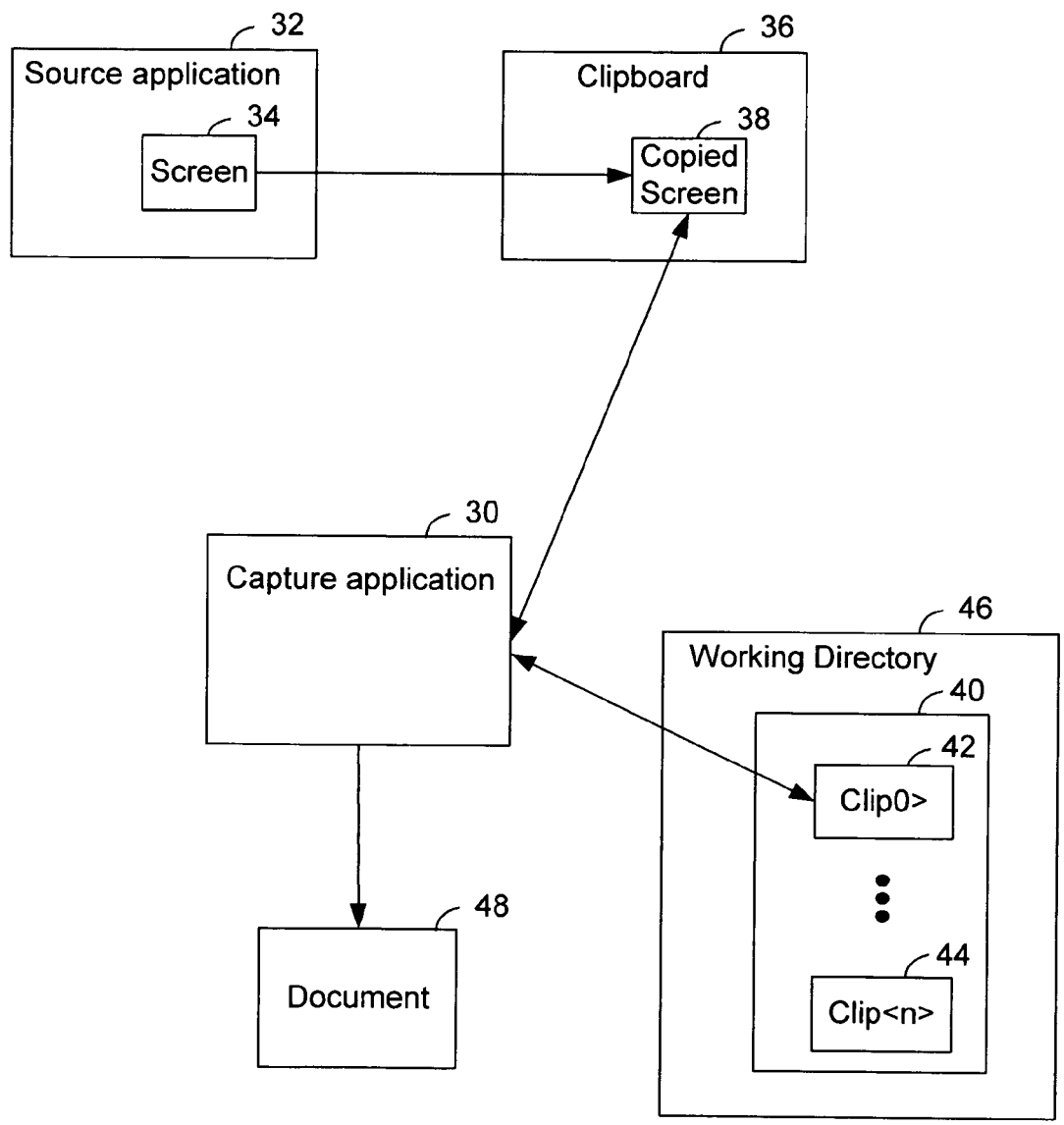
FIG. 1 depicts a high-level block diagram of the capturing of data by a capture application.

FIG. 1 depicts a high-level block diagram of the capturing of data by a capture application 30. A source application 32 has one or more screens 34. At least a portion of one of the screens 34 is copied to the clipboard 36 to provide a copied screen 38. In various embodiments, the capture application 30 is a computer program which automatically stores at least a portion of the copied screen 38 from the clipboard 36 to provide a captured screen, for example, clip0 42. The capture application also repeats the automatic storing to provide a set 40 of captured screens, clip0 42 to clip<n>44, in a working directory 46. In some embodiments, the capture application 30 builds a document 48 based on the set of captured screens 40. In various embodiments, the document 48 is used to document, that is, provide a record of, a software test of the source application 32, which in some embodiments, is a workflow application. However, the building of the document 48 is not meant to be limited to documenting a software test, and the document may be built for other purposes.

The clipboard 36 is typically an area of memory that is used to store text or an image that has been copied from an application. In some embodiments, the source application 32 is executed, and a user copies at least a portion of a displayed screen 34 from the source application 32 to the clipboard 36. For example, a user may execute a source application which has a graphical user interface, that is, a screen, select a portion of the screen using a mouse, and copy, typically by simultaneously pressing a control "Ctrl" key and a "C" key, the selected portion of the screen to the clipboard. In other embodiments, the screen 34 is automatically copied from the source application 32 to the clipboard 36. In various embodiments, the captured screens 42, 44 are sequentially displayed in a viewing area.

Figure 2:
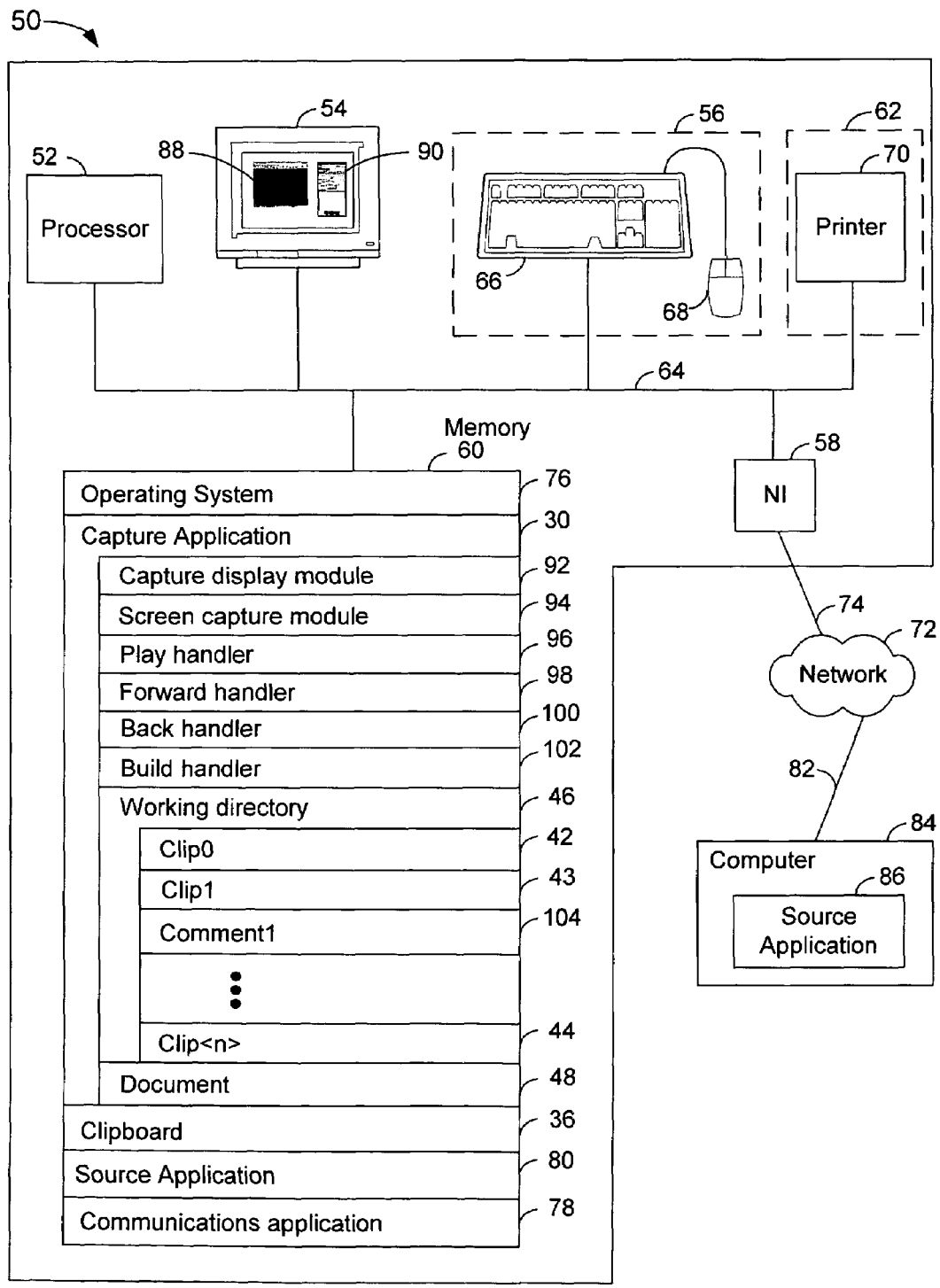
FIG. 2 depicts an illustrative computer system which uses various embodiments of the present invention.

FIG. 2 depicts an illustrative computer system 50 which uses various embodiments of the present invention. The computer system 50 comprises a processor 52, display 54, input interfaces (I/F) 56, communications interface 58, memory 60 and output interface(s) 62, all conventionally coupled by one or more buses 64. The input interfaces 56 comprise a keyboard 66 and a mouse 68. The output interface 62 comprises a printer 70. The communications interface 58 is a network interface (NI) that allows the computer 50 to communicate via a network 72, such as the Internet. The communications interface 58 may be coupled to a transmission medium 74 such as, a network transmission line, for example twisted pair, coaxial cable or fiber optic cable. In another embodiment, the communications interface 58 provides a wireless interface, that is, the communications interface 58 uses a wireless transmission medium.

The memory 60 generally comprises different modalities, illustratively semiconductor memory, such as random access memory (RAM), and disk drives. In various embodiments, the memory 60 stores an operating system 76, the capture application 30, the clipboard 36, and in some embodiments, a source application 80. In other embodiments, the memory 60 also stores a communications application 78.

In some embodiments, the network 72 is connected, via another transmission medium 82, to another computer system 84 that executes a source application 86. In various embodiments, the computer system 84 is a remote host, for example, a mainframe. The communications application 78 is used to connect the local computer system 50 to the remote computer system 84 via the network interface 58 and network 72 so that the source application 86 can be accessed. In various embodiments, the source application 86 executes on the remote computer system 84 in an OS/390® (Registered Trademark of International Business Machines Corporation) environment; and the communications application 78 is International Business Machines (IBM) Personal Communications.

The source application 32 (FIG. 1) may be the source application 80 on the local computer system 50 or may be the source application 86 on the remote computer system 84. The source application 32 is typically a workflow application which provides a graphical user interface comprising one or more windows or screens 88. In various embodiments, the screens are text-based. In some embodiments, the screens are Interactive System Productivity Facility (ISPF) panels. In other embodiments, the screens are images. In yet other embodiments, the screens comprise both text and images.

In various embodiments, the capture application 30 captures a workflow. The capture application 30 has a graphical user interface comprising a capture display screen 90 which is displayed on the display 54. In the capture application 30, a capture display module 92 provides the capture display screen 90. The capture application 30 comprises at least one handler which is associated with the graphical user interface. In some embodiments, the handlers comprise at least one or a combination of a screen capture module 94, a play handler 96, a forward handler 98, a back handler 100 and a build handler 102. The handlers will be described in further detail below.

In some embodiments, the capture application 30 is implemented using the Java® (Registered trademark of SUN Microsystems, Inc.) programming language. However, the capture application 30 is not meant to be limited to implementations using the Java programming language, and the capture application 30 may be implemented using other programming languages.

In various embodiments, the capture application 30 captures various screens of a workflow from the clipboard 36 and stores the screens in the working directory 46. Each captured screen is stored in a separate file, referred to as a clip with an integer indicating the order of capture, for example, clip0, clip1, . . . clip<n>, 40, 41 and 42, respectively. Alternately, the captured screens are stored in a single file such that individual screens can be identified. The clips that are stored in the working directory form a set of captured screens. Alternately, the captured screens that are stored in a single file are a set of captured screens. In some embodiments, a comment may be associated with a particular clip. The comment is stored in a comment file. For example, a comment for clip1 43 is stored in the comment1 file 104. In some embodiments, a document 48 is built based on at least a subset of the clips.

In various embodiments, the specific software instructions, data structures and data that implement various embodiments of the present invention are typically incorporated in the capture application 30, and in some embodiments, the communications application 78 and the source application 32. Generally, an embodiment of the present invention is tangibly embodied in a computer-readable medium, for example, the memory 60 and is comprised of instructions which, when executed by the processor 52, cause the computer system 50 to utilize the present invention. The memory 60 may store the software instructions, data structures and data for any of the operating system 76, capture application 30, the clipboard 36, the source application 80 and the communication application 78, in semiconductor memory, in disk memory, or a combination thereof.

The operating system 76 may be implemented by any conventional operating system such as AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

The clipboard 36 is typically provided by the operating system 76. For example, the Windows operating system typically provides a clipboard. Users can copy data to and from the clipboard.

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 2 is not intended to limit the present invention. Other alternative hardware environments may be used without departing from the scope of the present invention.

Figure 3:
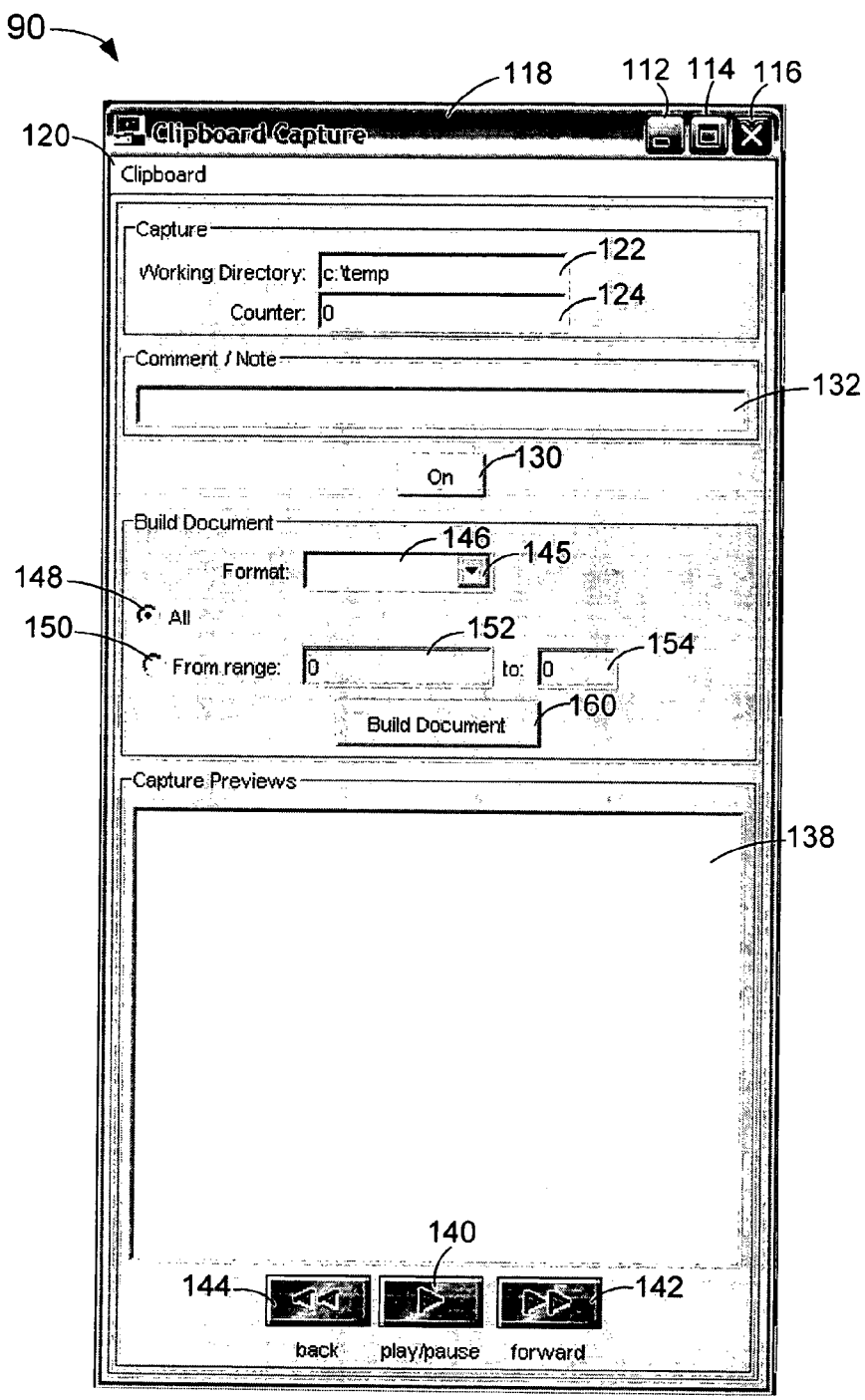
FIG. 3 depicts an embodiment of a capture display screen of the capture application of FIG. 2.

FIG. 3 depicts an embodiment of the capture display screen 90 of FIG. 2. When the capture application 30 (FIG. 2) is activated, the capture display module 92 (FIG. 2) is invoked, and the capture display module 92 (FIG. 2) displays the capture display screen 90. Typically the capture display screen 90 is a distinct window. Minimize, maximize and close buttons, 112, 114 and 116, in a title bar 118 allow the capture application 30 (FIG. 2) to be minimized, maximized and closed, respectively. The capture display screen 90 may also be resized. In some embodiments, the capture display screen 90 displays the text "Clipboard" 120. When a user right clicks on "Clipboard" 120, a drop-down menu is displayed. The drop-down menu has a "help" menu item and an "exit" menu item.

In various embodiments, the capture display screen 90 comprises a working directory text field 122 to allow a user to enter the name of a working directory. Alternately, no working directory text field is displayed and the capture display screen 90 uses a predefined default directory as the working directory. The working directory specifies where captured data is stored.

The capture display screen 90 also has a capture counter text field 124 which displays a value of a capture counter. The capture counter starts at zero and is incremented each time a screen is captured. Each captured screen is associated with a value of the capture counter. In various embodiments, a user may also supply the value of the capture counter in the capture counter text field 124.

When an "On" button 130 is activated, data is automatically captured from the clipboard. The "On" button 130 may be activated in any manner, for example, being clicked-on with a mouse or other input device, or using a keyboard. In some embodiments, another application invokes the capture application 30 (FIG. 2) and source application 32 (FIG. 1) and supplies the appropriate input(s), for example, activating the "On" button, to perform a test and capture various screens. Typically, the data on the clipboard 36 (FIG. 2) represents a screen that has been copied. The captured data is stored in a file. When the "On" button 130 is deactivated, data is no longer captured from the clipboard. The "On" button 130 may be deactivated in any manner, for example, by being clicked-on using a mouse or using the keyboard. The "On" button 130 will be described in further detail below.

In various embodiments, a user may supply a comment in a comment/note text field 132. Typically, the comment is entered in the comment/note text field 132 prior to copying the associated screen to the clipboard. During capture, the comment is associated with the data that is captured from the clipboard and saved in a file that is associated with the file that stores the captured data. For example, comment1 104 (FIG. 2) is associated with clip143 (FIG. 2). Typically the comment file has a .txt extension. In an alternate embodiment, the comment is stored in the same file as the captured data.

Captured screens may be viewed in a viewing area 138. When activated, a "play/pause" button 140 causes a set of captured screens in a specified working directory to be displayed automatically. When deactivated, the "play/pause" button 140 causes the automatic display of captured screens to stop. A "forward" button 142 allows a user to single step through the set of captured screens in the specified working directory in a forward direction. Another captured screen is displayed each time the "forward" button 142 is clicked on. A "back" button 144 allows a user to single step in a reverse direction through the set of captured screens in the specified working directory. Another captured screen is displayed each time the "back" button 144 is clicked on.

Figure 4:
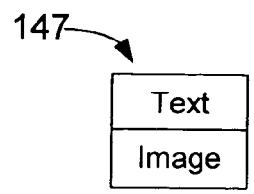
FIG. 4 depicts an embodiment of a drop-down list box of the capture display screen of FIG. 3.

In various embodiments, a user can build a document 48 (FIG. 2). A format field 146 is used to specify the format of the document. The format field 146 is associated with a down-arrow symbol 145. Referring also to FIG. 4, when the down-arrow symbol 145 is activated, a drop-down list box 147 is displayed. The drop-down list box 147 allows a user to select the document format. In the drop-down list box 147, the list of format choices comprises "Text" and "Image." When "Text" is selected, the document format is hypertext markup language (HTML) displaying captured data of the type text. When "Image" is selected, the document format is HTML displaying captured data of the type image. When no format is specified, the document format defaults to HTML for captured data of the type text.

When the "All" button 148 is selected, the document 48 (FIG. 2) is built based on all captured screens in the specified working directory. When the "From range" button 150 is activated, a user enters the values of the capture counter associated with the screens from which the document is to be built. A starting value is entered and/or displayed in a lower range text field 152 and an ending value is entered and/or displayed in an upper range text field 154. When the "Build Document" button 160 is activated, the build handler 102 (FIG. 2) is invoked and builds the document 48 (FIG. 2) in accordance with the range specified by either the "All" button 148 or the "From range" button 150, depending on the selection.

Figure 5:
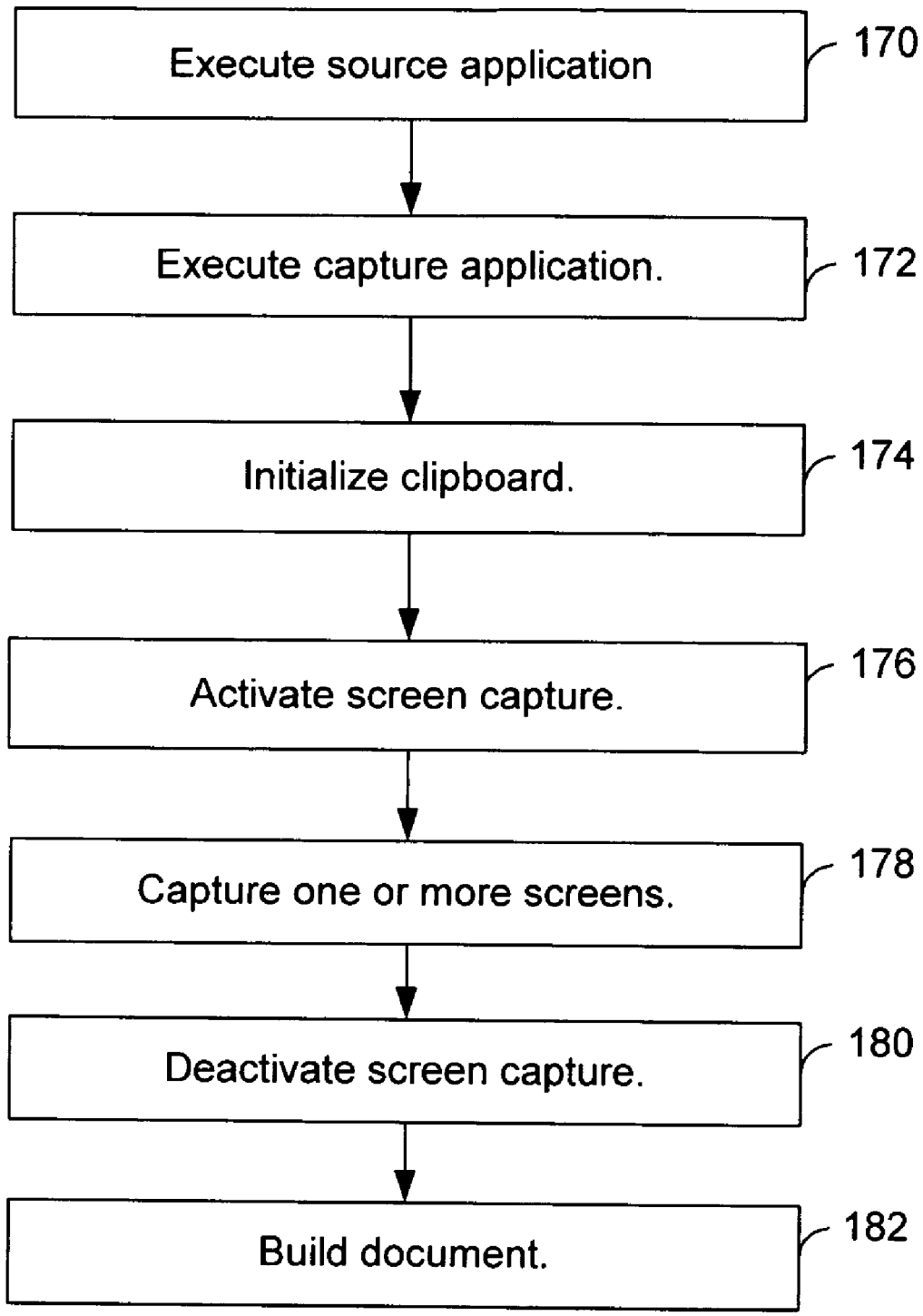
FIG. 5 depicts a high-level flowchart of an embodiment of capturing a screen.

FIG. 5 depicts a high-level flowchart of an embodiment of capturing one or more screens from a source application. In step 170, the source application 80 or 86 (FIG. 2) is executed. In some embodiments, the source application 80 or 86 (FIG. 2) is a workflow application using ISPF panels.

In step 172, the capture application 30 (FIG. 2) is executed and the capture display screen 90 (FIG. 3) is displayed. In step 174, the clipboard 36 (FIG. 2) is initialized. In various embodiments, a user copies a screen to the clipboard to initialize the clipboard. In other embodiments, a macro is created in the communications application 78 (FIG. 2) to automatically copy one or more screens to the clipboard 36 (FIG.

2) in addition to performing other functions. For example, a user may create a macro and invoke that macro to copy the currently displayed screen to the clipboard, to enter one or more characters or a command that supplies or emulates the enter key, and to copy the next displayed screen to the clipboard. In other embodiments, the source application 32 (FIG. 1) automatically copies screens to the clipboard 36 (FIG. 2). Alternately, another application supplies input data and commands to the source application and causes screens from the source application to be copied to the clipboard.

In step 176, the screen capture is activated from the capture display. The the "On" button 130 (FIG. 3) is activated to enable automatic screen capture. In step 178, one or more screens are automatically captured. The capture application detects that a screen is available on the clipboard and saves the screen in a clip file for later analysis, and in some embodiments, document generation. In step 180, screen capture is deactivated. In step 182, in some embodiments, the user activates the "Build Document" button 160 (FIG. 3) to build the document 48 (FIG. 2).

Figure 6:
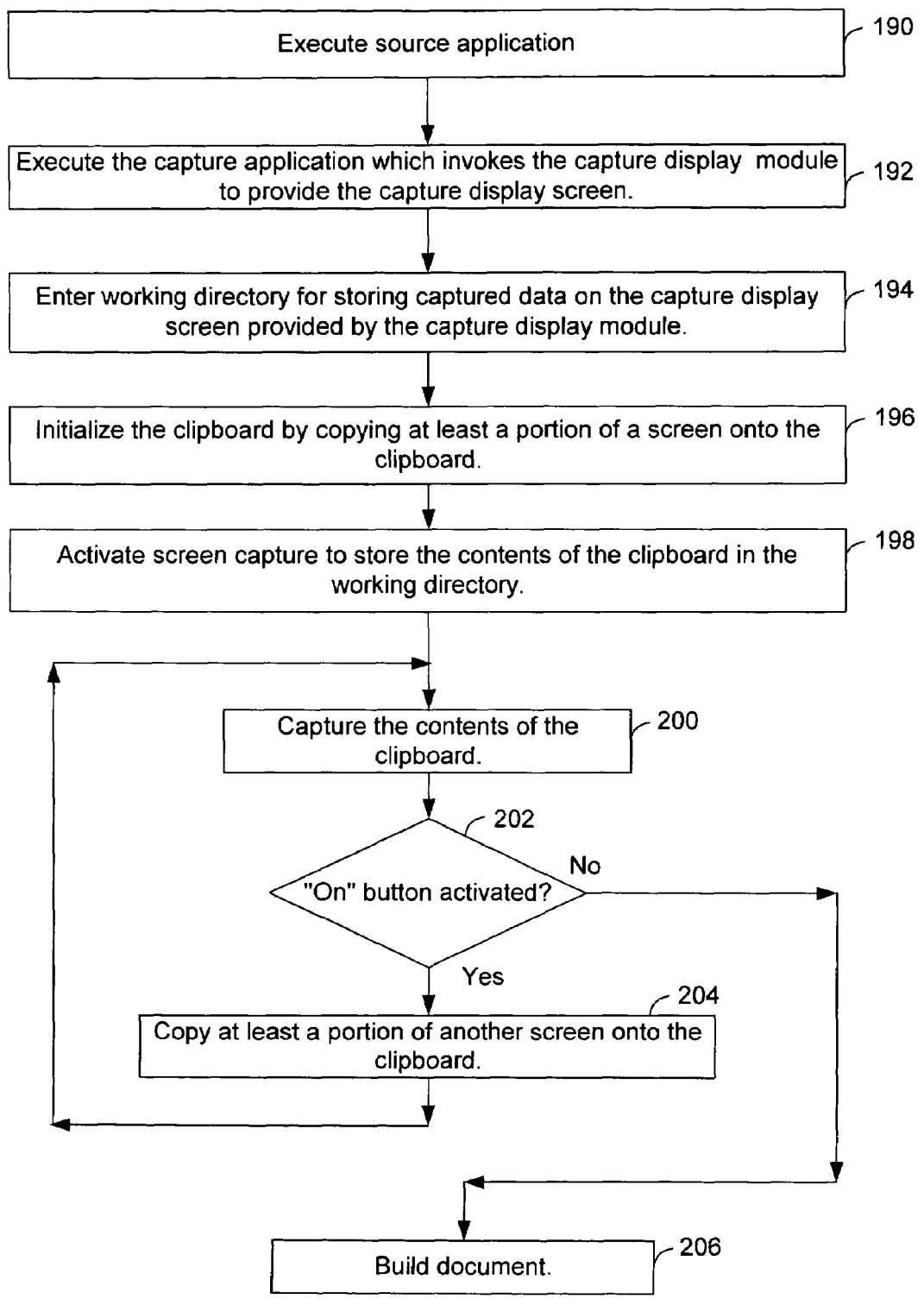
FIG. 6 depicts a more-detailed flowchart of an embodiment of capturing a screen of the flowchart of FIG. 5.

FIG. 6 depicts a more-detailed flowchart of an embodiment of capturing a screen of the flowchart of FIG. 5. In step 190, the source application is executed. Step 190 is the same as step 170 of FIG. 5. In step 192, the capture application 30 (FIG. 2) is executed. The capture application 30 (FIG. 2) invokes the capture display module 92 (FIG. 2) to provide the capture display screen 90 (FIG. 3). Step 192 is similar to step 172 of FIG. 5. In step 194, the name of the working directory for storing captured data is entered in the working directory text field 122 (FIG. 3) to provide a specified working directory. In step 196, the clipboard is initialized by copying data to the clipboard. Typically the data comprises at least a portion of a screen or window. The data may be text or bit-mapped. In step 198, screen capture is activated to store at least a portion of the contents of the clipboard in the specified working directory. The "On" button 130 (FIG. 3) is activated to activate screen capture. Step 198 is the same as step 176 of FIG. 5. In step 200, the contents of the clipboard are automatically captured by the capture application 30 (FIG. 2). Step 202 determines whether the "On" button 130 (FIG. 3) is activated. Step 202 is performed by the capture application 30 (FIG. 2). When the "On" button 130 is activated, in step 204, at least a portion of another screen is copied onto the clipboard, and step 204 proceeds back to step 200 which automatically captures the data on the clipboard. When the contents of the clipboard are retrieved, the clipboard is emptied. In some embodiments, a portion of a screen is copied on to the clipboard rather than the entire screen. When step 202 determines that the "On" button 130 (FIG. 3) is not activated, in step 206, the document 48 (FIG. 2) is built. The document 48 (FIG. 2) is typically built when the "Build Document" button 160 (FIG. 3) is activated. In other embodiments, step 206 is omitted.

Figure 7:
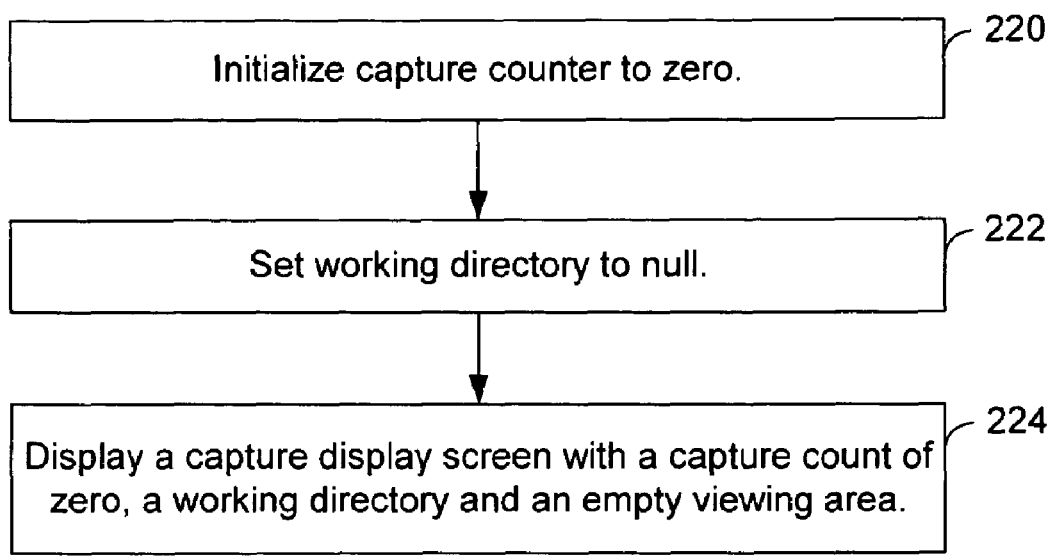
FIG. 7 depicts a flowchart of an embodiment of a capture display module of FIG. 2.

FIG. 7 depicts a flowchart of an embodiment of the operation of the capture display module 92 of FIG. 2. In step 220, the capture counter is initialized to zero. In step 222, the working directory is set to null. Alternately, the working directory is set to a predetermined default value, for example, "c:\temp." In step 224, the capture display screen 90 (FIG. 3) with a capture count of zero 124 (FIG. 3), a working directory 122 (FIG. 3) and an empty viewing area 138 (FIG. 3) is displayed.

Figure 8:
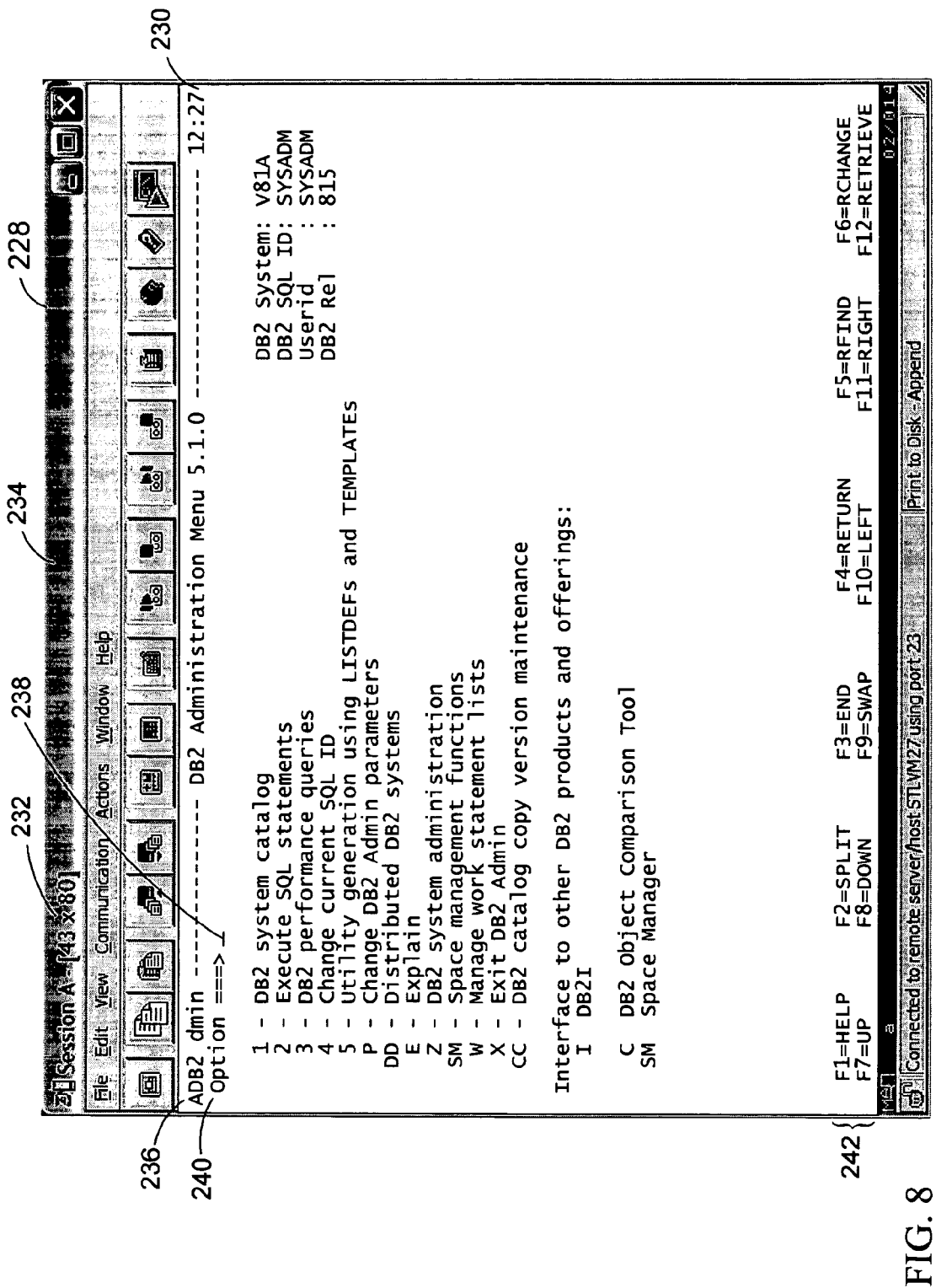
FIG. 8 depicts an exemplary text-based screen.

FIG. 8 depicts an exemplary graphical user interface 228 comprising a text-based screen 230 of the source application 32 (FIG. 1). In this example, the source application 32 is a workflow application. In various embodiments, the text-based screen 230 is an ISPF panel which is provided by the source application 86 (FIG. 2) which is executing in an OS/390 environment on computer system 84 (FIG. 2). The communications application 78 (FIG. 2), in some embodiments, IBM Personal Communications, is used to connect from the computer system 50 to the source application 86 on the other computer system 84 such that the graphical user interface 228 comprising the text-based screen 230 is displayed on the local computer system 50. This exemplary workflow application is the IBM DB2® (Registered Trademark of International Business Machines Corporation) database management system, and the text-based screen 230 is an Administration Menu. However, the invention is not meant to be limited to the IBM DB2 database management system and may be used with other applications. In addition, the invention is not meant to be limited to applications that provide text-based screens and may be used with other applications that provide a graphical user interface. The text-based screen 230 comprises cells organized as an array of rows and columns. One character is typically associated with a cell. The number of rows and columns 232 in the ISPF panel is displayed in the title bar 234. The rows are also referred to as lines. In various embodiments, a panel identifier (id) 236 at the beginning of the panel identifies the panel. In this example, the panel id is "ADB2" 236. In addition, an ISPF panel typically has at least one input area 238. A navigational value is a type of input data which is entered on line two 240. Data that is entered on other than line two 240 is also referred to as input data. In this example, input area 238 contains a navigational value because it is on line two 240. Typically, after inputting data, the user presses an enter key. When enter is pressed after inputting the navigational value, another screen is displayed. The navigational value is used to navigate through various ISPF panels. In various embodiments of ISPF panels, a help menu 242 is displayed across the bottom of the screen. In FIG. 8, the text-based screen 230 has black text on a white background. In other embodiments, the text-based screen has a black background with white or light-colored text.

Figure 9:
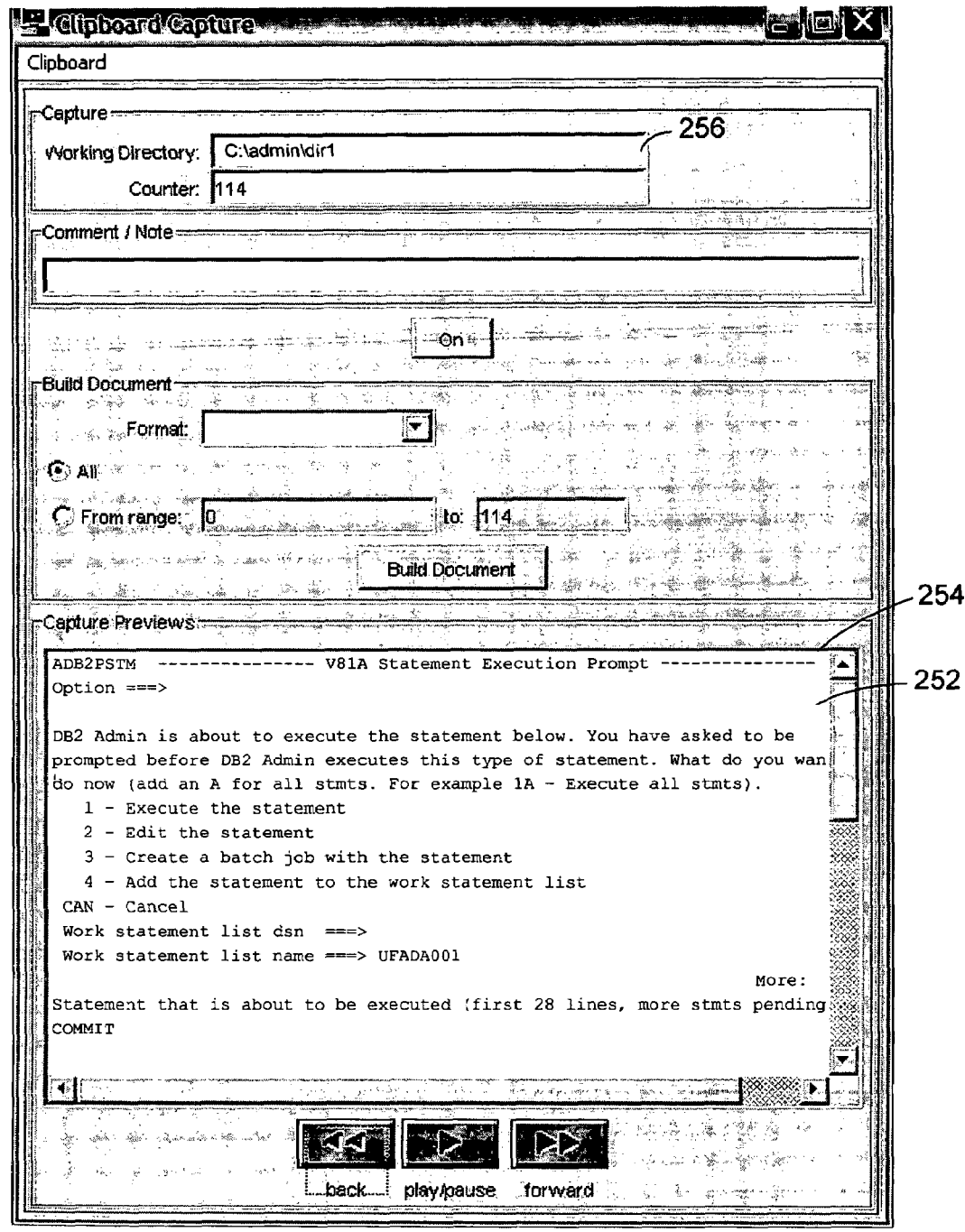
FIG. 9 depicts an embodiment of the capture display screen of FIG. 3 displaying an exemplary captured text-based screen.

FIG. 9 depicts an embodiment of a capture display screen 250 displaying a captured text-based screen 252 in the viewing area 254. In FIG. 9, a user has specified the working directory in the working directory text field 256. The specified working directory is C:\admin\dir1. The capture counter has a value of 114 which means that the $114^{th}$ screen or clip is being displayed in the viewing area 254. In various embodiments, the value of the displayed capture counter is associated with the clip that is being displayed in the viewing area. In other embodiments, the value of the displayed capture counter references the next clip that will be displayed or captured. Because the viewing area is not sufficiently large to display the entire captured screen, the viewing area 254 has horizontal and vertical scrollbars. In some embodiments, the help menu 242 (FIG. 8) is not copied or, if copied, the help menu 242 (FIG. 8) is not stored as the captured data. In FIG. 9, the captured text-based screen 252 is displayed in the viewing area 254 with black text on a white background. In other embodiments, the captured text-based screen 252 is displayed in the viewing area 254 with white or light-colored text on a black background.

Figure 10A:
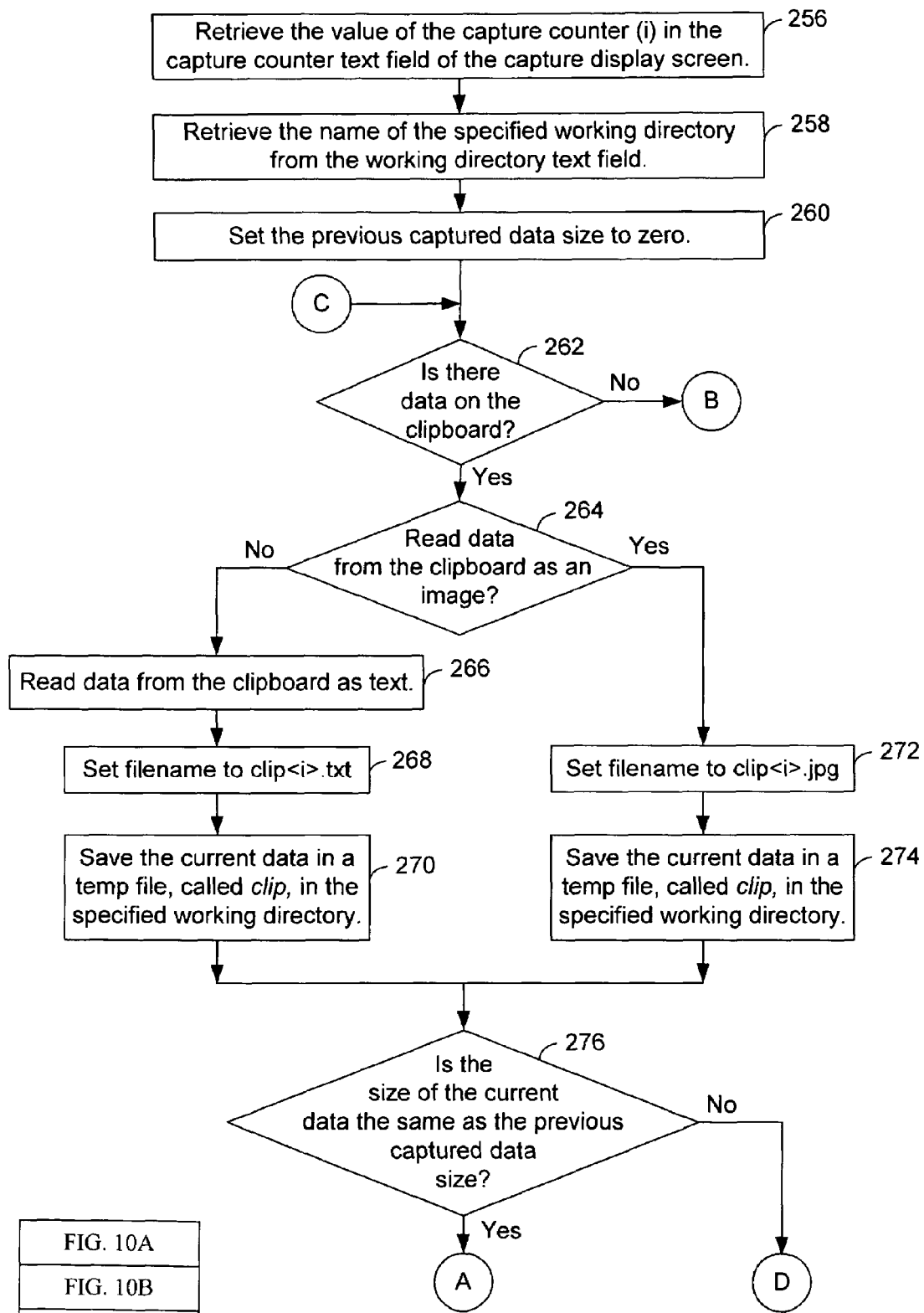
FIG. 10 comprises FIGS. 10A, 10B and 10C which collectively depict a flowchart of an embodiment of the screen capture module of FIG. 2.
Figure 10B:
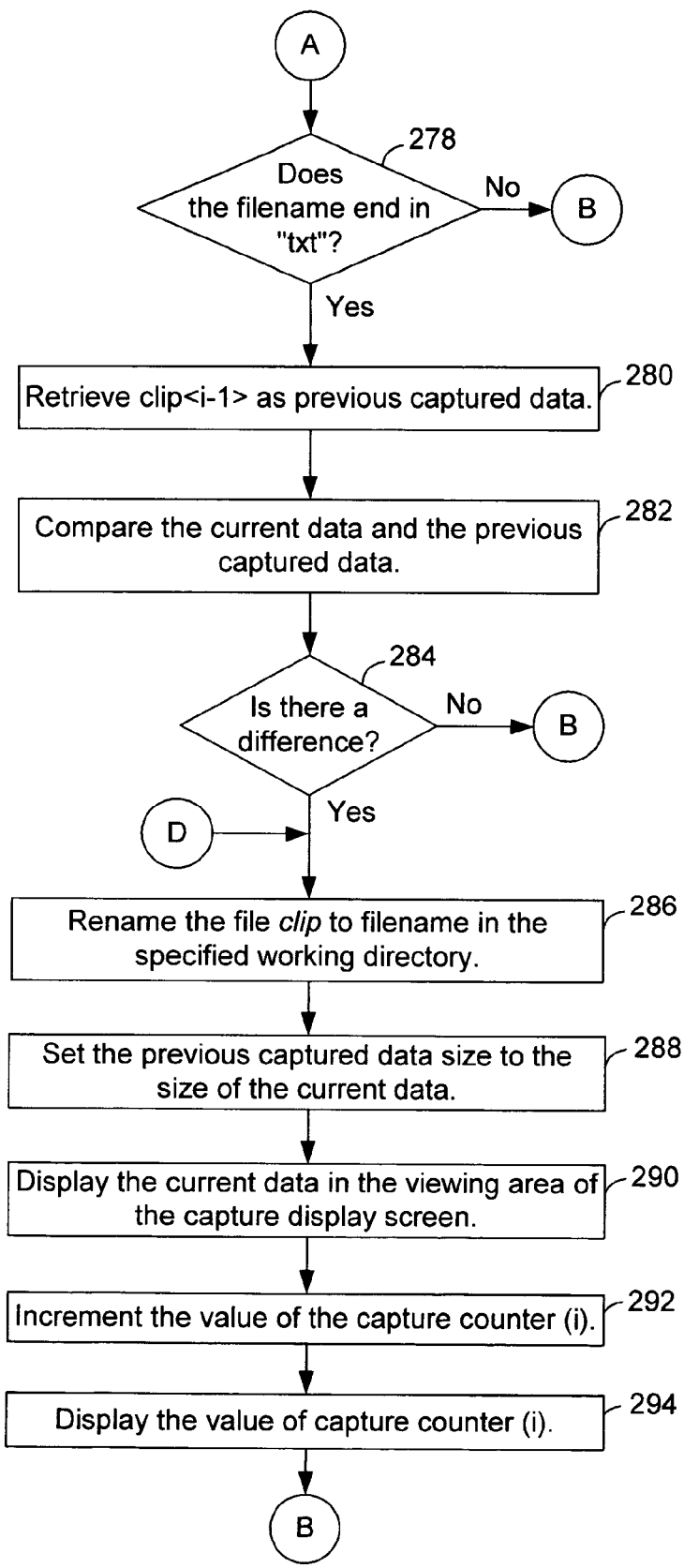
Figure 10C:
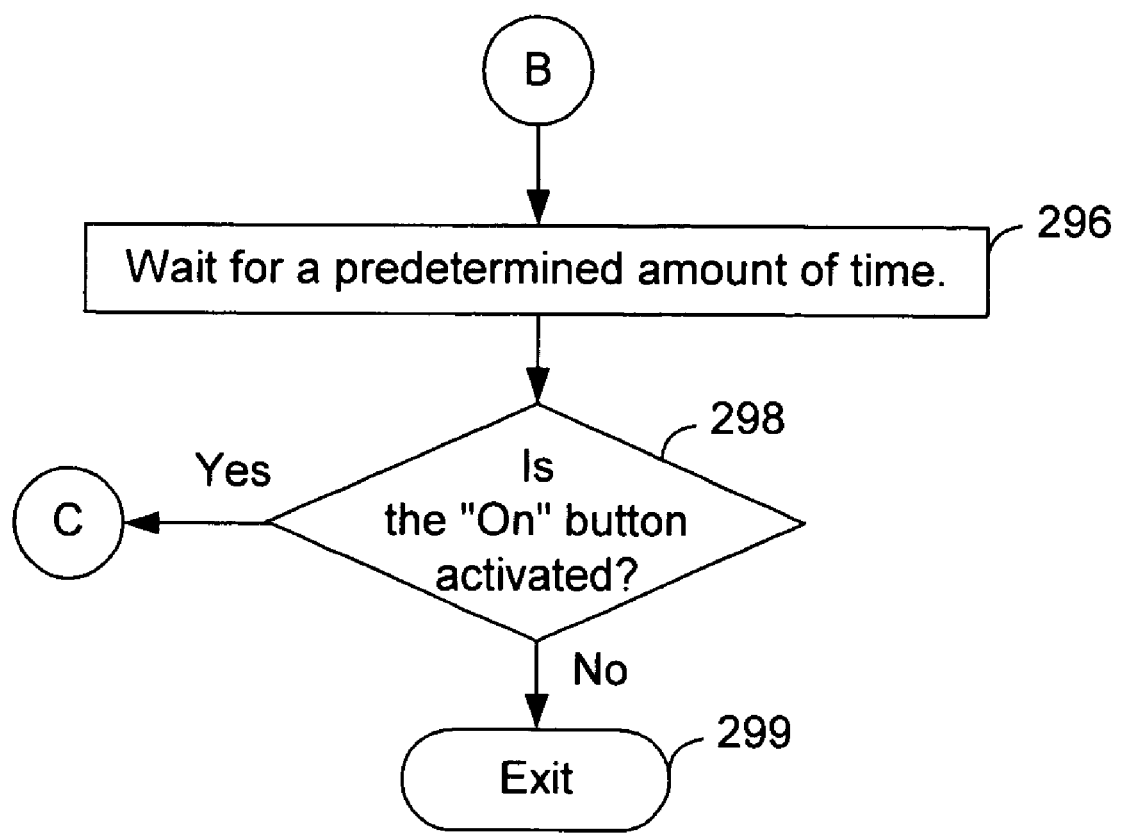

FIGS. 10A, 10B and 10C collectively depict a flowchart of an embodiment of the screen capture module 94 of FIG. 2. In this embodiment, the screen capture module 94 (FIG. 2) captures both text-based and bit-mapped image screens. In various embodiments, the screen capture module 94 (FIG. 2) is implemented as a separate thread. Alternately, the screen capture module 94 (FIG. 2) is implemented as a separate process, and in some embodiments, a daemon process. The screen capture module 94 (FIG. 2) is invoked when the "On" button 130 (FIG. 3) is activated. Before activating the "On" button 130 (FIG. 3), data has been placed on the clipboard.

In step 256, the value of the capture counter (i) is retrieved from the capture counter text field 124 (FIG. 3) of the capture display screen 90 (FIG. 3). In step 260, the name of the specified working directory is retrieved from the working directory text field 122 (FIG. 3). In step 260, the previous captured data size, a variable, is set equal to zero.

Step 262 determines whether data is on the clipboard. When step 262 determines that data is on the clipboard, in step 264, the data is retrieved from the clipboard to provide current data. Retrieving data from the clipboard results in that data being removed from the clipboard.

In some embodiments, in step 264, the screen capture module attempts to read the data from the clipboard as an image. When step 264 determines that the data from the clipboard cannot be read as an image, in step 266, the screen capture module reads the data from the clipboard as text, and the data is referred to as current data. In step 268, a variable, called filename, is set to clip<i>.txt. For example, when the value of the capture counter, i, is equal to 1, filename is set to clip 1.txt. The "txt" extension is used because the current data is text-based. In step 270, the current data is saved to a temporary (temp) file, called clip, in the specified working directory. Step 270 proceeds to step 276.

When step 264 determines that the data from the clipboard was read as an image, the data is referred to as current data and, in step 272, the variable, called filename, is set to clip<i>.jpg. For example, when the value of the capture counter, i, is equal to 2, filename is set to clip2.jpg. In step 274, the current data is saved to a temporary (temp) file, called clip, in the specified working directory. Step 274 proceeds to step 276.

Step 276 determines whether the size of the current data is the same as the previous captured data size. When step 276 determines that the size of the current data is the same as the previous captured data size, step 276 proceeds via Continuator A to step 278 of FIG. 10B.

In FIG. 10B, step 278 determines whether the filename ends in "txt". When step 278 determines that the filename ends in "txt", in step 280, clip<i-1> is retrieved from the specified working directory as previous captured data. In step 282, the current data and the previous captured data are compared. Step 284 determines whether there is a difference between the current data and the previous captured data. In some embodiments, steps 282 and 284 are combined.

When step 284 determines that there is a difference between the current data and the previous captured data, step 284 proceeds to step 286. In step 286, the file named clip is renamed to the filename in the specified working directory. In step 288, the previous captured data size is set equal to the size of the current captured data. In step 290, the current data is displayed in the viewing area of the capture display screen. In step 292, the value of the capture counter (i) is incremented by one. In step 294, the value of the capture counter (i) is displayed. In this embodiment, the displayed value of the capture counter references the next screen that will be captured. In other embodiments, steps 292 and 294 are reversed so that the displayed value of the capture counter references the clip file associated with the screen that contains the current data. Step 294 proceeds via Continuator B to step 296 of FIG. 10C.

In FIG. 10C, in step 296, the screen capture module waits for a predetermined amount of time. In some embodiments, the predetermined amount of time is about two seconds; however, the predetermined amount of time is not meant to be limited to two seconds, and other amounts of time may be used.

Step 298 determines whether the "On" button 130 (FIG. 3) is activated. When step 290 determines that the "On" button is not activated, in step 299, the screen capture module exits. When step 290 determines that the "On" button is activated, step 298 proceeds via Continuator C to step 262 of FIG. 10A to check for new data on the clipboard.

When step 262 of FIG. 10A, determines that there is no data on the clipboard, step 262 proceeds via Continuator B to step 296 of FIG. 10C to wait for a predetermined amount of time before checking for data on the clipboard again.

When step 276 of FIG. 10A determines that the size of the current data is not the same as the previous captured data size, step 276 proceeds via Continuator D to step 286 of FIG. 10B to store the current data as captured data.

When step 278 of FIG. 10B determines that the filename does not end in "txt", step 278 proceeds via Continuator B to step 296 of FIG. 10C to wait for a predetermined amount of time.

When step 284 of FIG. 10B determines that there is no difference between the current data and the previous captured data, step 284 proceeds via Continuator B to step 296 of FIG. 10C.

In another embodiment, the screen capture module stores a portion of the data which associated with a screen that is read from the clipboard.

Figure 11:
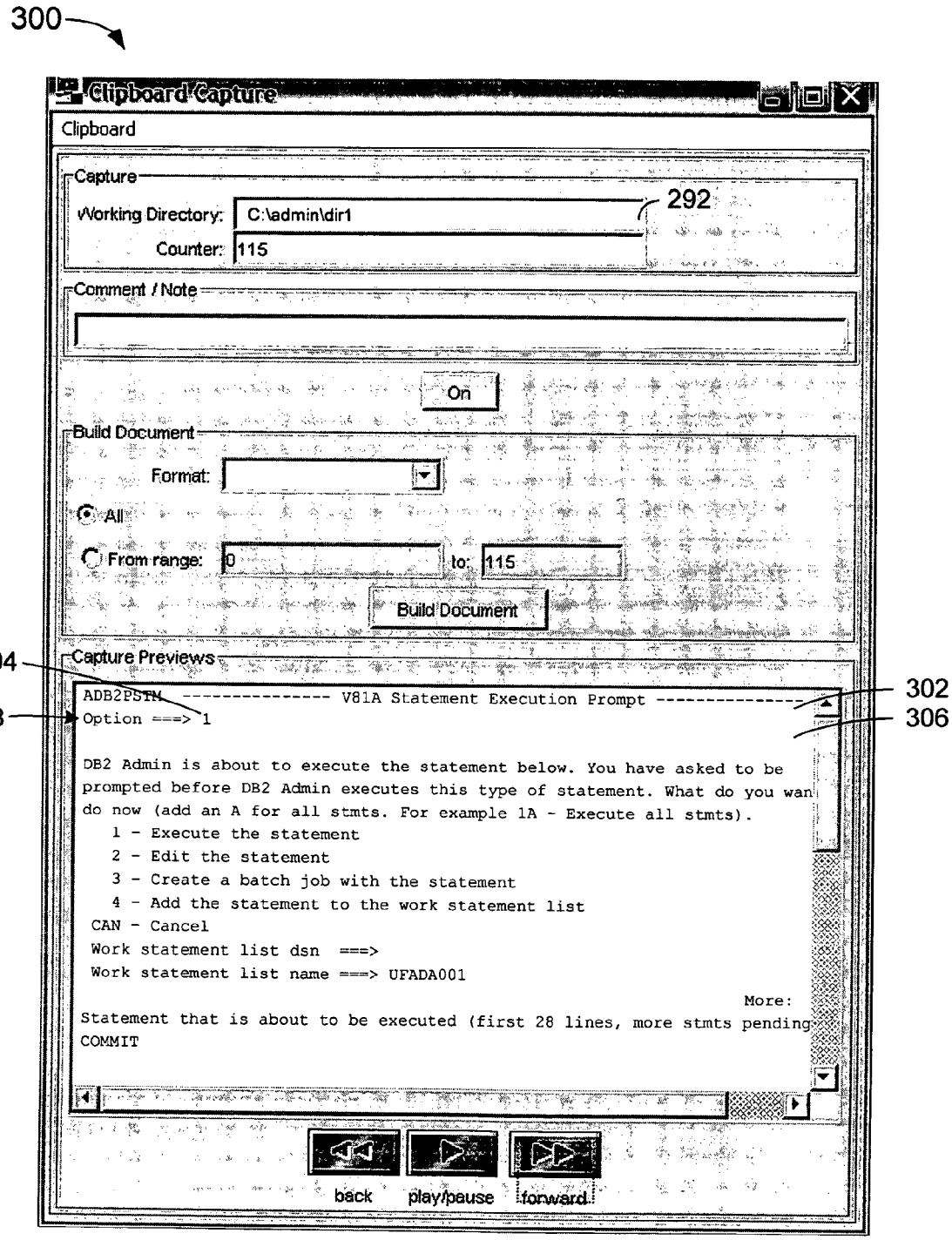
FIG. 11 depicts an embodiment of another capture display screen displaying a captured text-based screen with user input data.

FIG. 11 depicts an embodiment of another capture display screen 300 displaying a captured text-based screen 302 in a viewing area 306. The captured text-based screen has input data 304. In various embodiments, the input data may be supplied by a user, a macro or another application. In FIG. 11, the capture counter text field displays "115". In FIG. 9, clip114.txt is displayed and in FIG. 11, clip115.txt 302 is displayed. In clip115.txt 302, a "1" 304 has been entered as input data associated with the "Option" prompt. The option prompt is on line two, therefore the input of "1" 304 is a navigational value.

Figure 12:
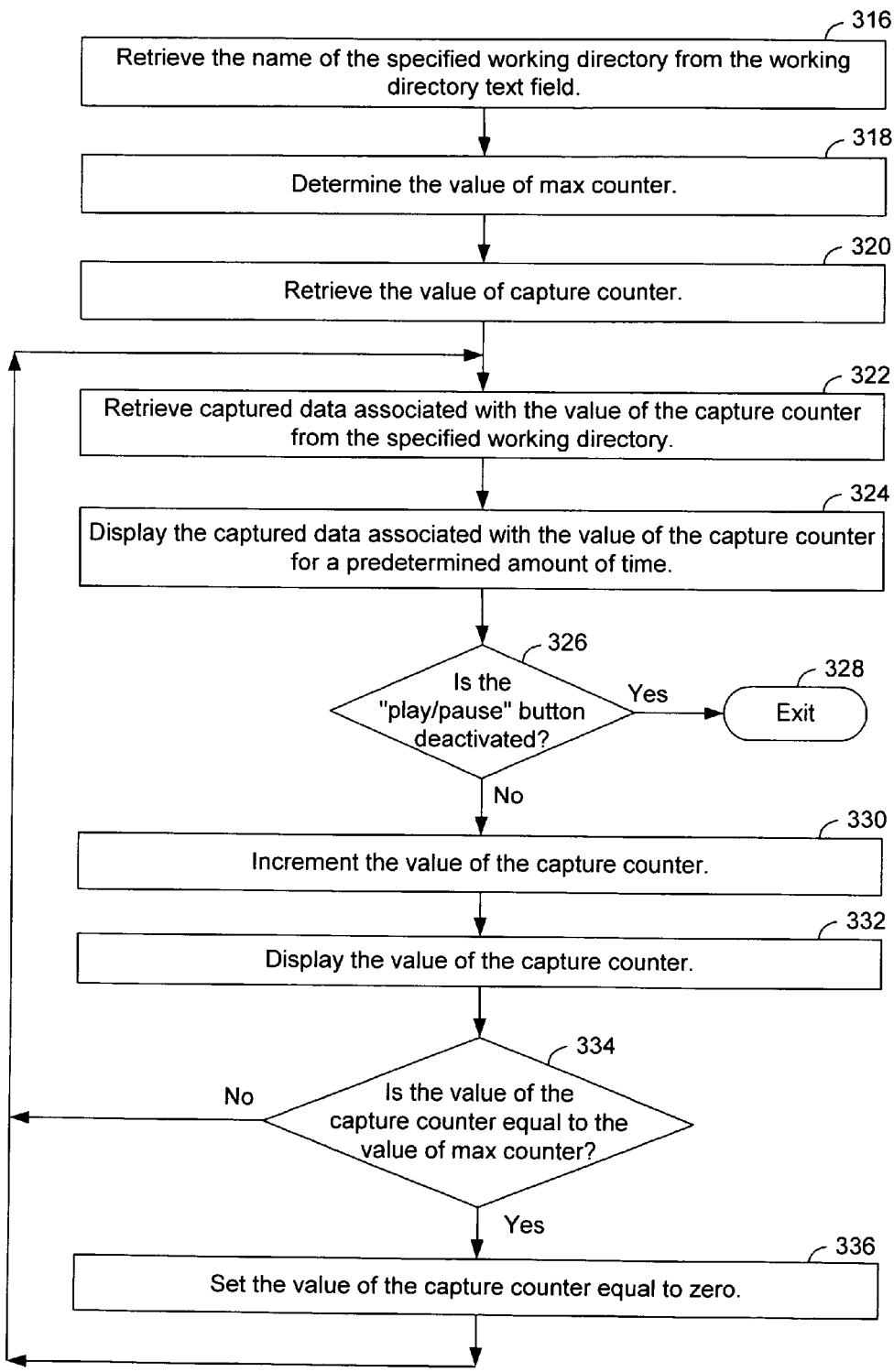
FIG. 12 depicts a flowchart of an embodiment of a technique to play back captured screens when the "play/pause" button of FIG. 3 is activated.

FIG. 12 depicts a flowchart of an embodiment of a technique to playback captured screens in an embodiment of the play handler 96 of FIG. 2. In step 316, the name of the specified working directory is retrieved from the working directory text field. In step 318, a value of a variable, referred to as max counter, is determined. The value of max counter is associated with the highest integer value in the file names of the clips. In other words, the value of max counter is equal to the highest integer value that is part of the file names containing the clips in the specified working directory. In step 320, the value of the capture counter is retrieved from the capture counter text field 124 (FIG. 3). In step 322, the captured data associated with the value of the capture counter is retrieved from the specified working directory. In step 324, the captured data associated with the value of the capture counter is displayed for a predetermined amount of time in the viewing area 138 (FIG. 3) of the capture display screen 90 (FIG. 3). For example, for a text file, such as clip 1.txt, the play handler reads the text data in clip 1.txt, formats that data using HTML tags and displays the formatted text data in the viewing area 138 (FIG. 3). In another example, image data is also formatted using HTML tags. Step 326 determines whether the "play/pause" button 140 (FIG. 3) is deactivated. When step 326 determines that the "play/pause" button 140 (FIG. 3) is deactivated, in step 328, the flowchart exits. When step 326 determines the "play/pause" button 140 (FIG. 3) is not deactivated, in step 330, the value of the capture counter is incremented by one. In step 332, the value of the capture counter is displayed in the capture counter text field 124 (FIG. 3) of the capture display screen 90 (FIG. 3). Step 334 determines whether the value of the capture counter is equal to the value of max counter. When step 334 determines that the value of the capture counter is not equal to the value of max counter, step 334 proceeds to step 322. When step 334 determines that the value of the capture counter is equal to the value of max counter, in step 336, the value of the capture counter is set equal to zero. Step 336 proceeds to step 322.

Figure 13:
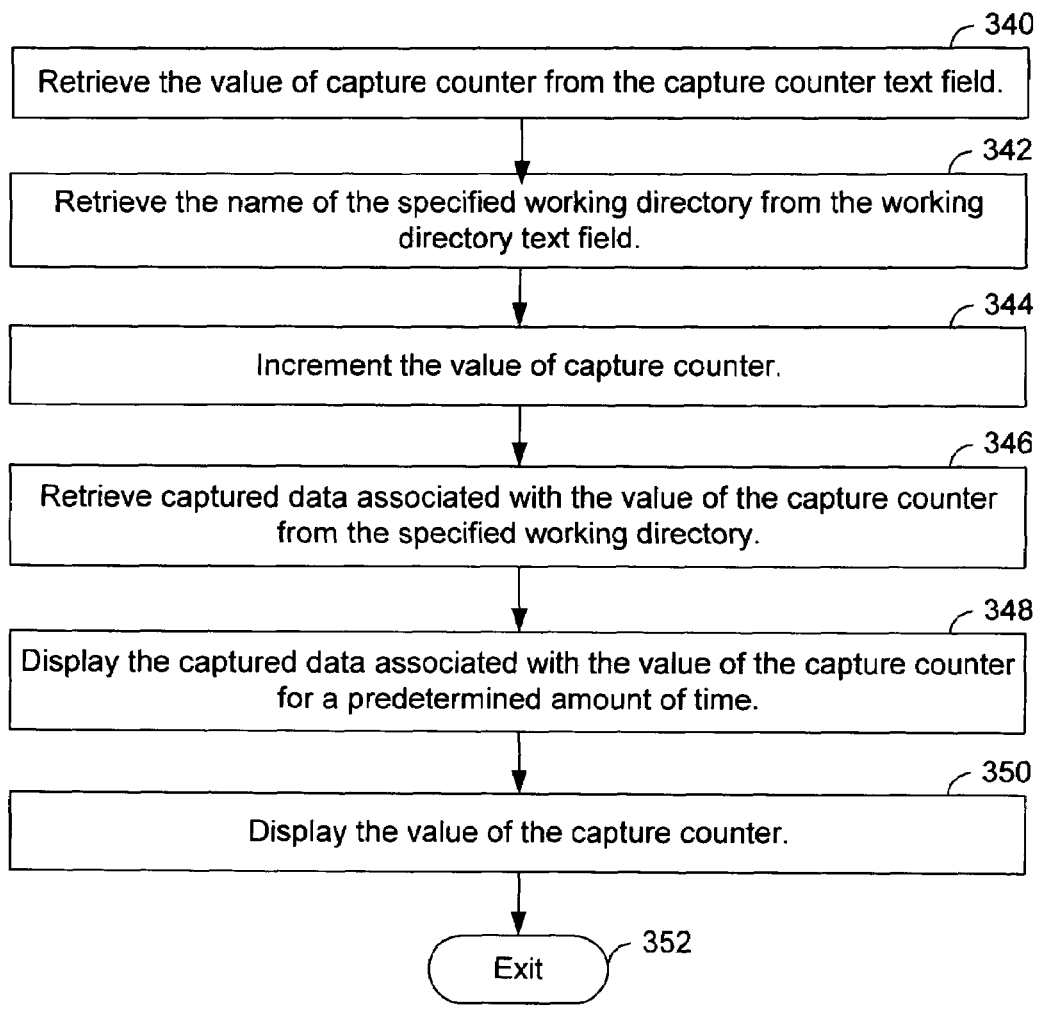
FIG. 13 depicts a flowchart of an embodiment of displaying a screen when a "forward" button of FIG. 3 is activated.

FIG. 13 depicts a flowchart of an embodiment of displaying a screen when the "forward" button 142 (FIG. 3) of the capture display screen 90 (FIG. 3) is activated. In various embodiments, the flowchart of FIG. 13 is implemented in the forward handler 98 of FIG. 2. When the "forward" button 142 (FIG. 3) is activated, the forward handler 98 (FIG. 2) is invoked.

In step 340, the value of the capture counter is retrieved from the capture counter text field 124 (FIG. 3) of the capture display screen 90 (FIG. 3). In step 342, the name of the specified working directory is retrieved from the working directory text field 122 (FIG. 3). In step 344, the value of the capture counter is incremented by one. In step 346, the captured data associated with the value of the capture counter is retrieved from the specified working directory. In particular, the clip associated with the value of the capture counter in the specified working directory is retrieved. For example, when the value of the capture counter is equal to two, clip2, in the specified working directory, is retrieved. In step 348, the captured data associated with the value of the capture counter is displayed for a predetermined amount of time in the viewing area 138 (FIG. 3) of the capture display screen 90 (FIG. 3). In step 350, the value of the capture counter is displayed. In step 352, the flowchart exits.

Figure 14:
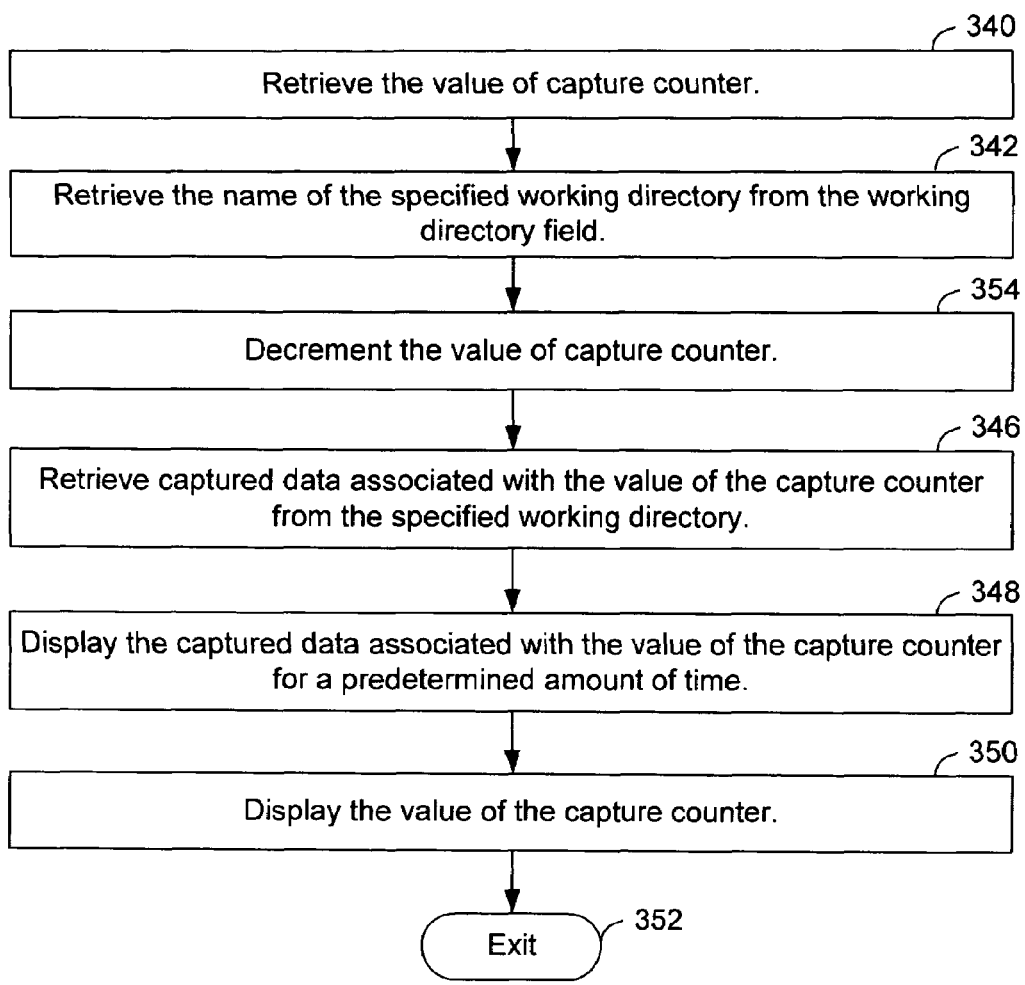
FIG. 14 depicts a flowchart of an embodiment of displaying a screen when a "back" button of FIG. 3 is activated.

FIG. 14 depicts a flowchart of an embodiment of displaying a screen when the "back" button 144 (FIG. 3) of the capture display screen 90 (FIG. 3) is activated. In various embodiments, the flowchart of FIG. 14 is implemented in the back handler 100 of FIG. 2. When the "back" button 144 (FIG. 3) is activated, the back handler 100 (FIG. 2) is invoked. The flowchart of FIG. 14 is similar to the flowchart of FIG. 13; therefore the differences will be described. Step 354 replaces step 344 of FIG. 13. In step 354, the value of the capture counter is decremented.

Figure 15:
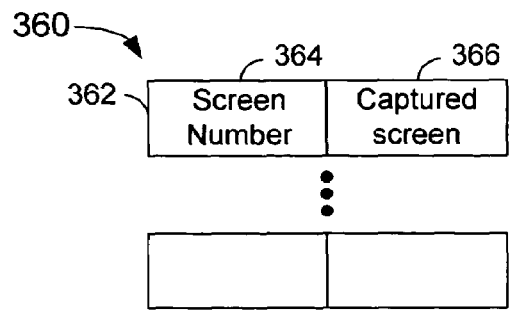
FIG. 15 depicts an embodiment of the document of FIG. 2.

FIG. 15 depicts a block diagram of an embodiment 360 of the document of FIG. 2. The document 360 comprises one or more rows 362 in a table format. Each row 362 comprises a screen number 364 and the captured screen column 366. In some embodiments, the entire captured screen is stored in the document. In other embodiments, a portion of the captured screen is stored in the document.

Figure 16:
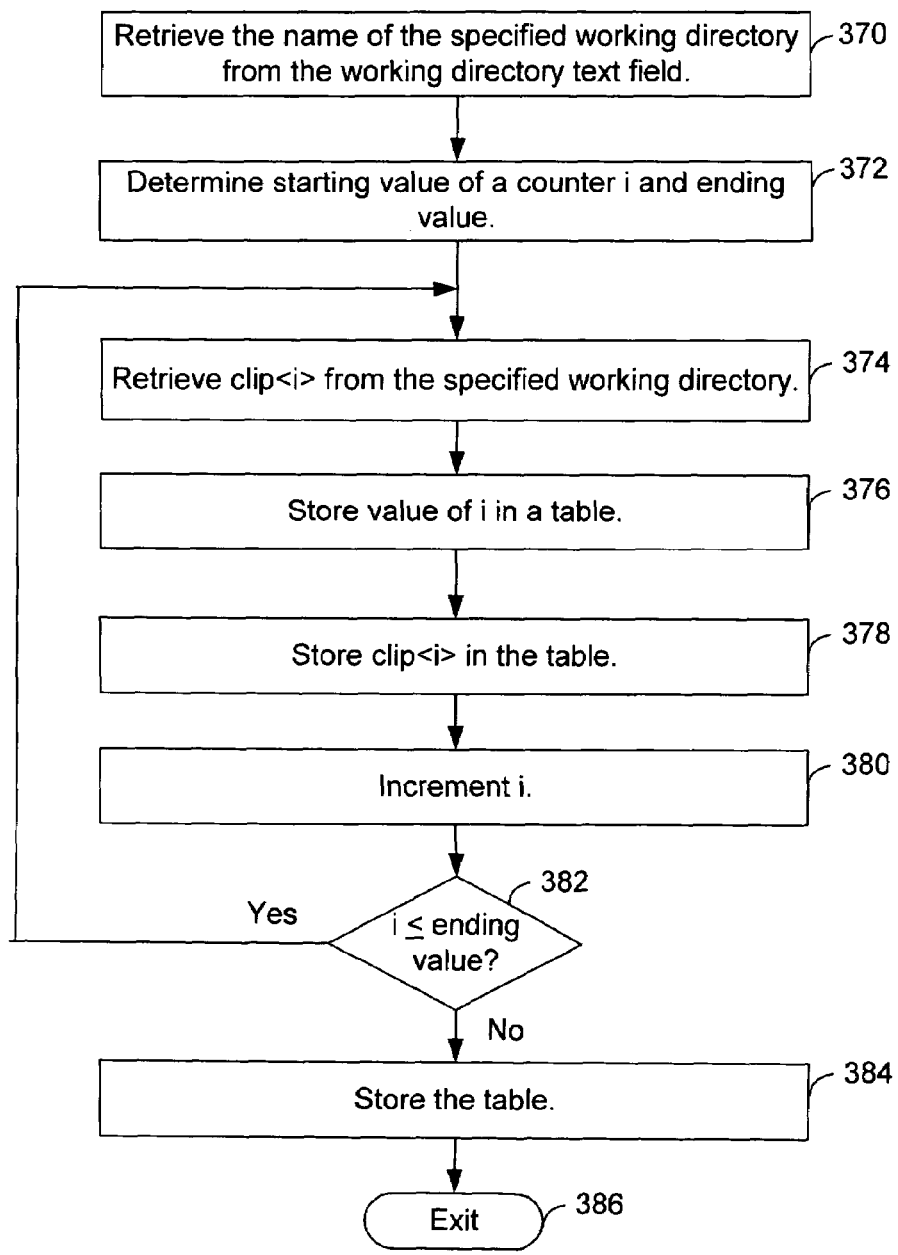
FIG. 16 depicts a flowchart of an embodiment of building the document of FIG. 15.

FIG. 16 depicts a flowchart of an embodiment of building the document of FIG. 15. In this embodiment, the document is a table. In some embodiments, the flowchart of FIG. 16 is implemented in the build handler 102 of FIG. 2. In various embodiments, the build handler 102 (FIG. 2) is invoked when the "Build Document" button 160 (FIG. 3) is activated. In step 370, the name of the specified working directory is retrieved from the working directory text field 122 (FIG. 3). In step 372, the starting value of a counter i and an ending value are determined. When the "All" button 148 (FIG. 3) is activated, the ending value is set equal to the highest numerical value in a name of a clip in the specified working directory, and the starting value i is set equal to zero. For example, when clip53.txt is the clip having the highest integer value, that is fifty-three, in the specified working directory, the ending value is set equal to fifty-three. When the "From range" button 150 (FIG. 3) is activated, the upper and lower values of the range are retrieved from the upper and lower range text fields, 154 and 152 (FIG. 3), respectively, of the capture display screen 90 (FIG. 3). The ending value is set equal to the value of the upper range text field 154 (FIG. 3), and counter i is set equal to the value of the lower range text field 152 (FIG. 3).

In step 374, clip<i> is retrieved from the specified working directory to a captured data area. In step 376, the value of i is stored in the table 360 (FIG. 15) as the screen number 364 (FIG. 15). In step 378, clip<i> is stored in the capture screen column 366 (FIG. 15) of the table. In various embodiments, the information in the clip file is formatted using HTML tags and stored in the table. Different formatting is typically used for text and image data. In step 380, i is incremented by one. Step 382 determines whether the value of i is less than or equal to the ending value. When step 382 determines that the value of i is less than or equal to the ending value, step 382 proceeds to step 374. When step 382 determines that the value of i is not less than or equal to the ending value, in step 384, the table, that is, the document, is stored as a file. Typically, the document is stored in the specified working directory. Alternately, the document is stored in a predetermined directory. In step 386, the flowchart exits.

Figure 17:
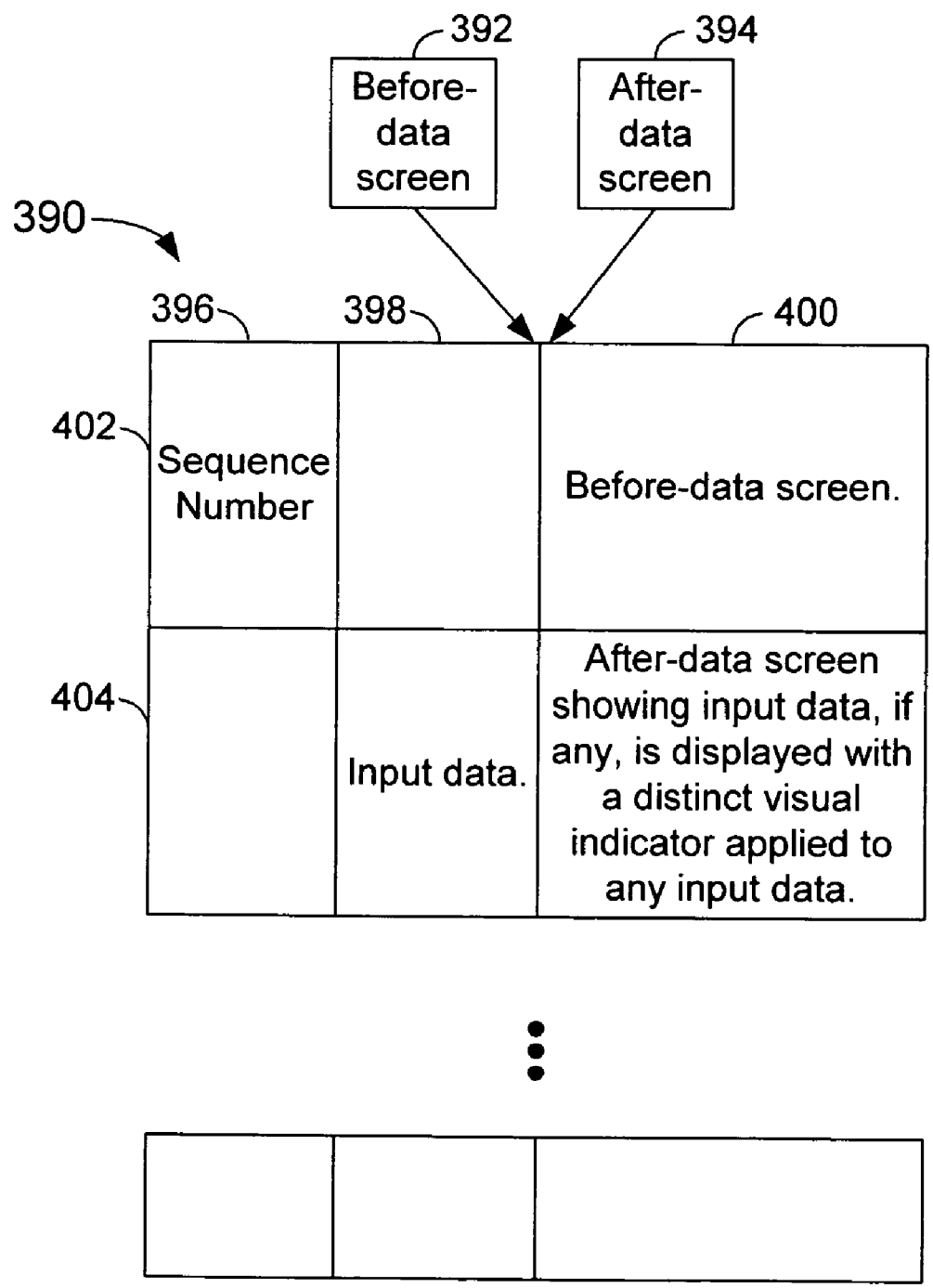
FIG. 17 depicts a block diagram of another embodiment of a document of FIG. 2 for text-based screens.

FIG. 17 depicts a block diagram of another embodiment 390 of a document of FIG. 2 for text-based screens. In yet another embodiment, the build handler 102 of FIG. 2 produces the document 390. In this embodiment, a before-data screen 392 and an after-data screen 394 have been captured. The build handler 102 (FIG. 2) determines a sequence number and outputs the sequence number to the sequence number column 396 of the document 390. The sequence number typically indicates the order of the screens. In various embodiments, the before-data screen 394 is stored in the screen column 400 in a row 402 of the document 390. Input data to the before-data screen 392 is identified. The build handler 102 (FIG. 2) stores, in another row 404, another sequence number, and the input data in the input data column 398 of the document 390. The build handler 102 (FIG. 2) also outputs the after-data screen 394 to the document 390. The after-data screen is stored in the screen column 400 of row 404 of the document 390. In various embodiments, when the after-data screen contains any input data, a distinct visual indicator is applied to that input data. The visual indicator comprises at least one or any combination of a distinct font color, distinct background color, distinct background pattern, the text may be bold, italic and/or underlined, distinct type of font, distinct font size and enclosing the input data in a box. In some embodiments, the distinct visual indicator comprises distinct animation such as blinking which appears when the document is displayed on the display 54 (FIG. 2).

In some embodiments, the document is an HTML document depicting captured data of the type text. In other embodiments, the document is an HTML document depicting captured data of the type image.

In various embodiments, the document is used to document a software test. However, the document is not meant to be limited to documenting a software test and may be used for other applications. Building the document typically depends on the type of source application, and the desired screens to be saved.

Figure 18B:
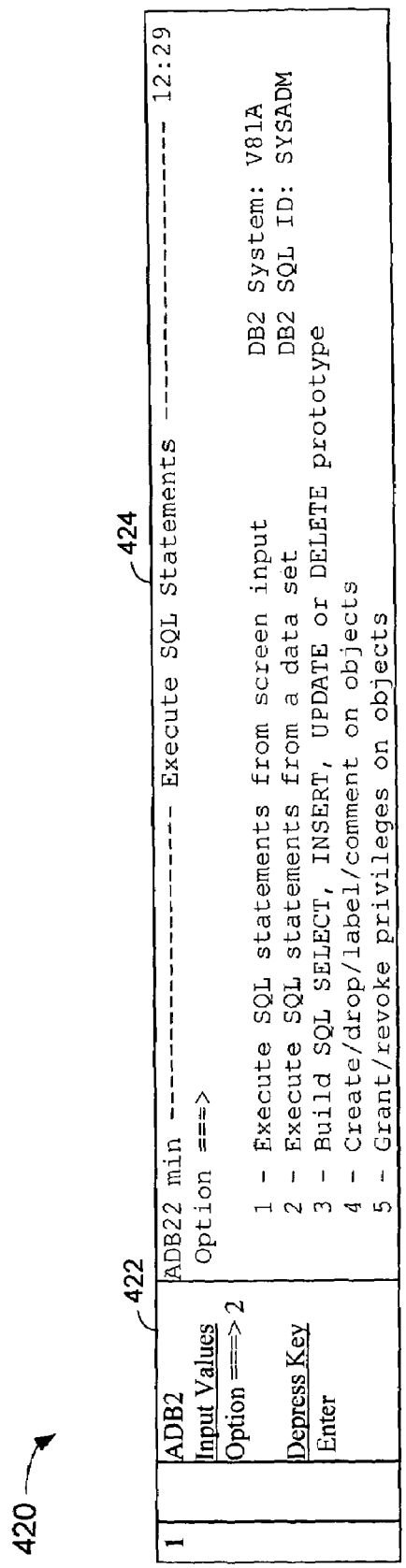
FIG. 18 comprises FIGS. 18A, 18B, 18C and 18D which collectively depict yet another embodiment of the document of FIG. 2.

FIG. 18 comprises FIGS. 18A, 18B, 18C and 18D which collectively depict a portion of yet another embodiment 410 of the document of FIG. 2 for text-based screens. The document 410 typically comprises a plurality of rows in a table format. Referring to FIG. 18A, the rows comprise a sequence number (Seq.) column 412, a steps column 414, a user input column 416 and a verification column 418. The sequence number column 412 stores a sequence number that is used to keep track of the order of the screens in the verification column 418. In some embodiments, the sequence number column 412 is omitted. The steps column (Steps) 414 stores a step number. In various embodiments, the step number is associated with a step to test a source application. In some embodiments, the step number and/or column is omitted. The user input column 416 (User Input) displays the data which was input to a previous screen to provide the screen in the verification column 418 for that row. The input data is typically derived by comparing sequential screens. In some embodiments, a user may modify the document and manually enter the input data. The initial captured screen is not typically associated with a sequence number.

FIG. 18B depicts another exemplary row 420 of the document. In this row, a user has input a "2" and pressed "Enter", as shown in column 422, in the screen in the verification column 418 of FIG. 18A to produce the screen shown in the verification column 424 of FIG. 18B.

FIG. 18C depicts another exemplary row 430 of the document. In this row, the sequence number is equal to "2", and the user has input a value of "4" in the option field of the screen in the verification column 424 of FIG. 18B and pressed enter, as shown in the user input column 432 of FIG. 18C to provide the screen shown in the verification column 434 of FIG. 18C.

FIG. 18D depicts additional exemplary rows 436 and 438 of the document. In row 436, the sequence number is equal to "3". As shown in the user input column 440, the user supplied a value of "CS" in the option field of line two in the screen in the verification column 434 of FIG. 18C and pressed enter to provide the screen shown in the verification column 442 of row 436.

In row 438, the sequence number is equal to "4". As shown in the user input column 440, the user supplied a value of "TPADB101" 444 in the TABLESPACE field of the screen in the verification column 442 of row 436 to provide the screen shown in the verification column 442 of row 438. In the screen shown in the verification column 442 of row 438, a distinct visual indicator is applied to the input value "TPADB01" 446. The distinct visual indicator was described above.

FIG. 19 comprises FIGS. 19A, 19B, 19C, 19D, 19E, 19F and 19G which collectively depict a flowchart of yet another embodiment of building the document 410 of FIG. 18. In various embodiments, the flowchart of FIG. 19 is implemented in the build handler 102 of FIG. 2. When the build document button 160 (FIG. 3) is activated, the build handler 102 (FIG. 2) is invoked.

In step 452, a previous panel identifier (id) is initialized to an empty string; previous panel capture data is initialized to an empty string; a previous navigational value is initialized to NULL; a line number is initialized to equal zero; a current navigation value is initialized to NULL and a panel comment string is initialized to NULL. In step 454, table column headers are output. In various embodiments, the table column headers are Seq., Steps, User Input, and Verification, which correspond to columns one, two, three and four, 412, 414, 416 and 418 (FIG. 18A), respectively.

In step 456, the specified working directory is retrieved from the working directory text field of the capture display screen. In step 458, the starting value of a counter called i and ending value are determined as described with respect to step 372 of FIG. 16. In step 460, the build handler 102 (FIG. 2) gets a handle (F1) to contain the contents of a file, clip<i>.txt, which contains captured data in the specified working directory. Step 462 determines whether F 1 exists, in other words, whether the file clip<i> exists in the specified working directory. When step 462 determines that F 1 exists, in step 464, the build handler gets a handle (F2) to a comment file, comment<i> in the specified working directory. Step 466 determines whether F2 exists, in other words, whether the comment file, comment<i>, exists in the specified working directory. When step 466 determines that F2 exists, in step 468, the comment in the comment file is retrieved into a panel comment string using handle F2, and step 468 proceeds via Continuator A to step 470 of FIG. 19B. When step 466 determines that F2 does not exist, step 466 proceeds via Continuator A to step 470 of FIG. 19B.

Figure 19A:
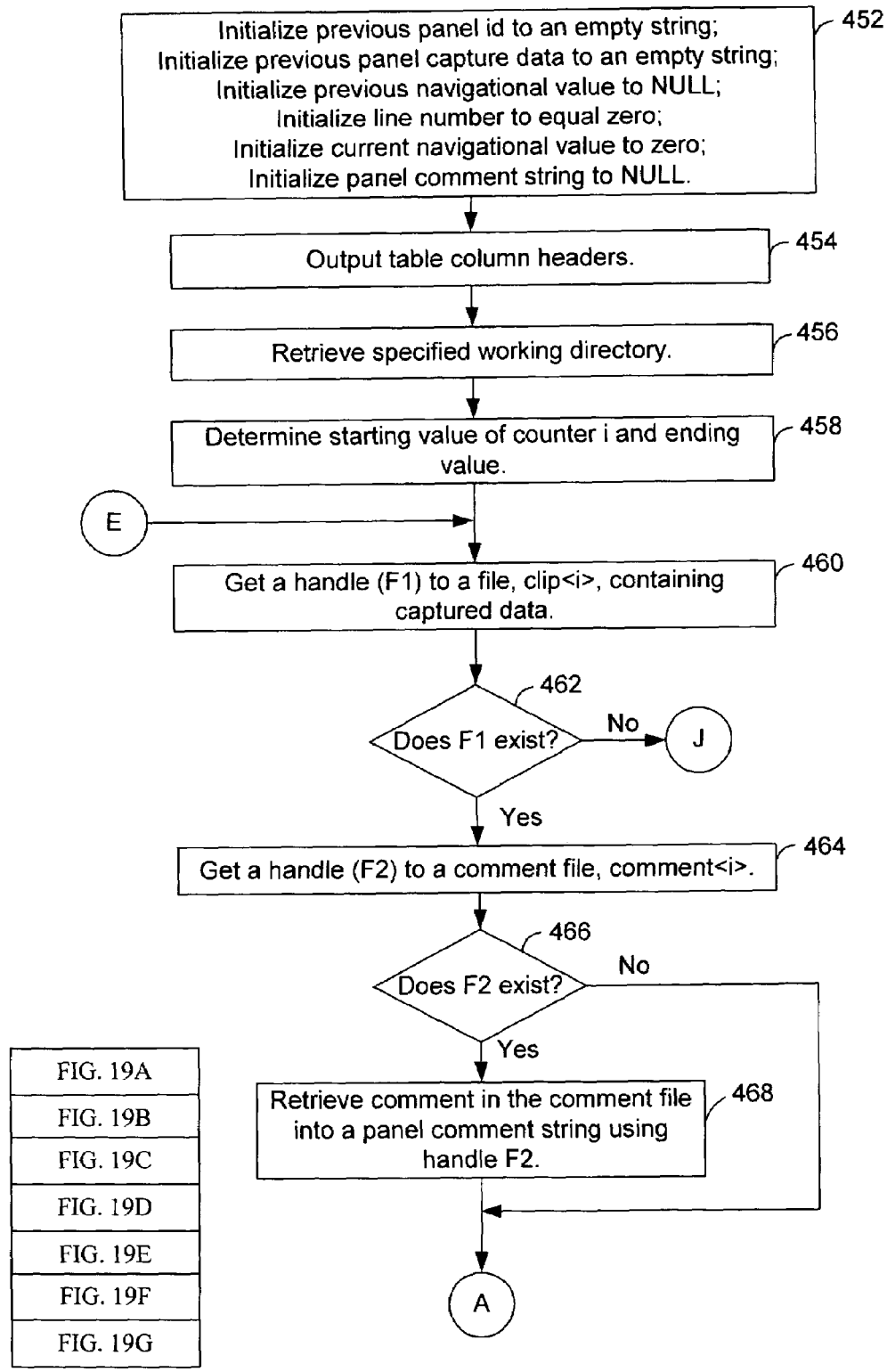
FIG. 19 comprises FIGS. 19A, 19B, 19C, 19D, 19E, 19F and 19G which collectively depict a flowchart of an embodiment of building a document having the format of FIG. 18.
Figure 19B:
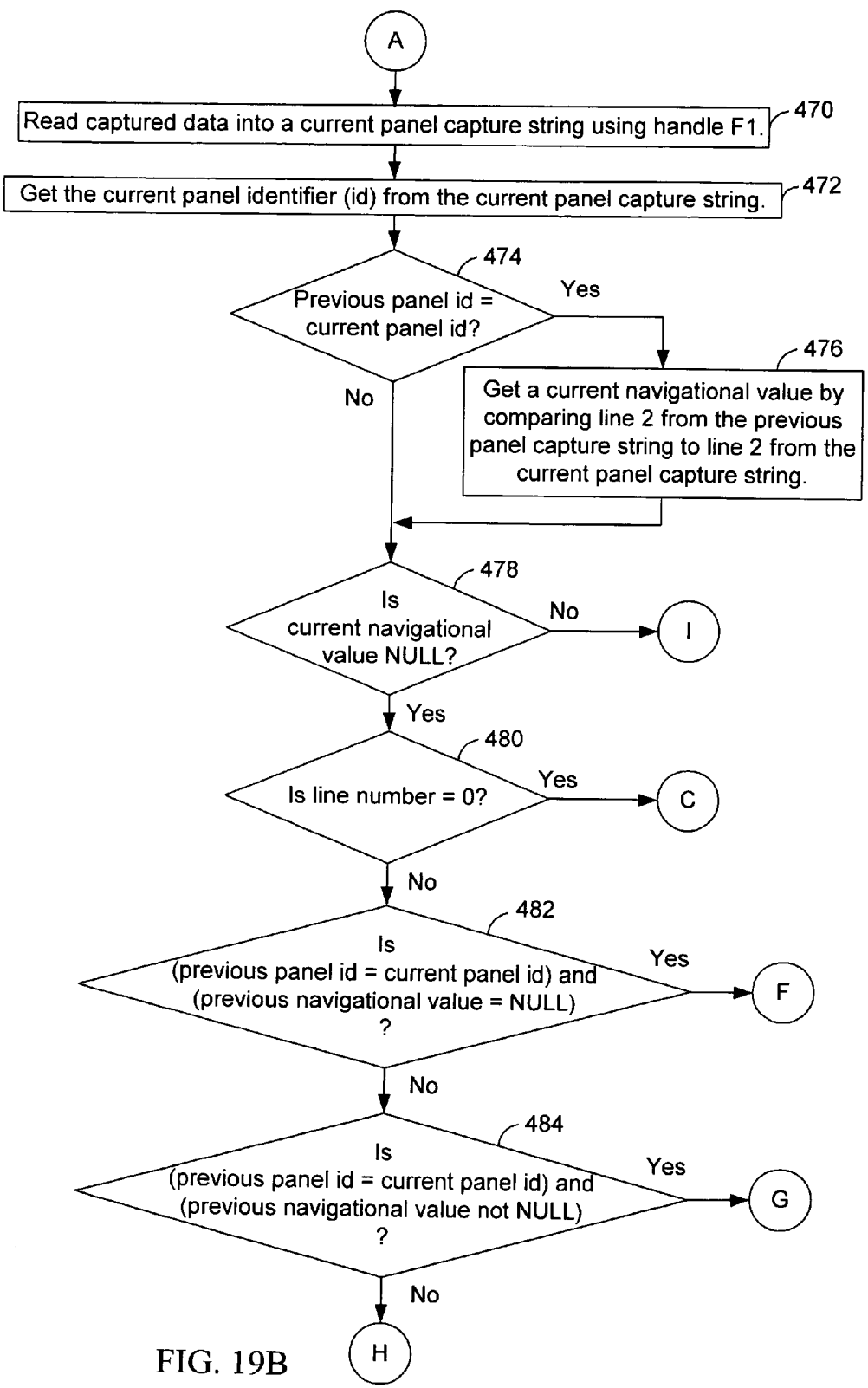

In FIG. 19B, in step 470, captured data from the file, clip<i>, is read into a current panel capture string using handle F1. In step 472, the build handler gets the current panel identifier (id) from the current panel capture string. Step 474 determines whether the previous panel id is equal to the current panel id. When step 474 determines that the previous panel id is equal to the current panel id, in step 476, the build handler gets a current navigational value by comparing line two from the previous panel capture string to line two from the current panel capture string and proceeds to step 478. When step 474 determines that the previous panel id is not equal to the current panel id, step 474 proceeds to step 478.

Step 478 determines whether the current navigational value is NULL. When step 478 determines that the current navigational value is NULL, step 480 determines whether the line number is equal to zero.

When step 480 determines that the line number is not equal to zero, step 482 determines whether the previous panel id is equal to the current panel id and the previous navigational value is equal to NULL. When step 482 determines whether the previous panel id is not equal to the current panel id or the previous navigational value is not equal to NULL, step 484 determines whether the previous panel id is equal to the current panel id and whether the previous navigational value is not NULL.

Figure 19C:
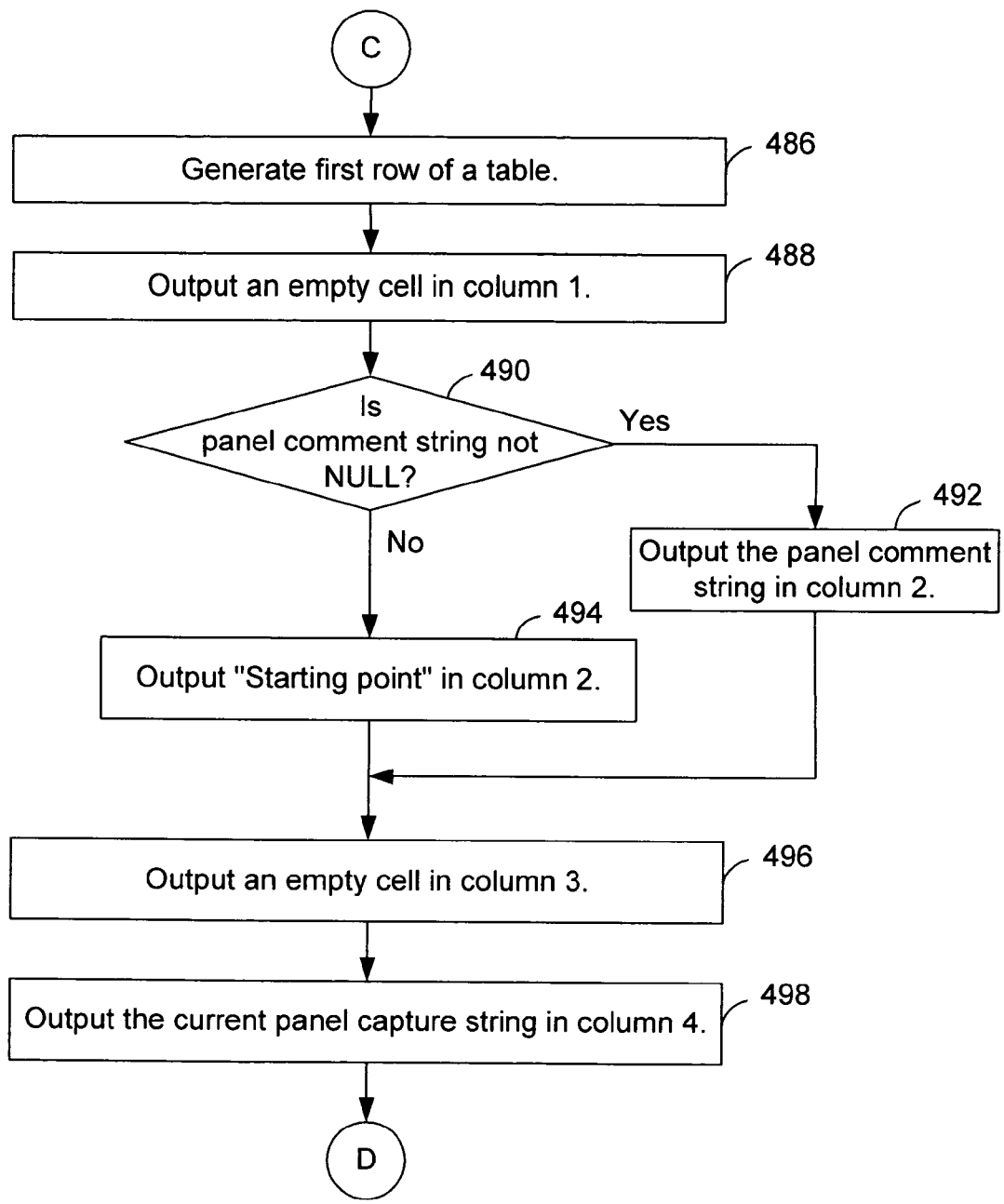

When step 480 determines that the line number is equal to zero, step 480 proceeds via Continuator C to step 486 of FIG. 19C to generate the first row of the table.

In FIG. 19C, in step 486, the first row of the table is generated. In various embodiments, the first row is generated as a HTML row tag <TR>. In step 488, an empty cell is output in column one of the row. Step 490 determines whether the panel comment string is not NULL. When step 490 determines that the panel comment string is not NULL, in step 492, the panel comment string is output in column two of the row and step 492 proceeds to step 496. When step 490 determines that the panel comment string is NULL, in step 494, the text "Starting point" is output in column two of the row, and step 494 proceeds to step 496. In step 496, an empty cell is output in column three of the row. In step 498, the current panel capture string is output in column four of the row. In various embodiments, the current panel capture string is output in a format that uses HTML tags. Step 498 proceeds via Continuator D to step 500 of FIG. 19D.

Figure 19D:
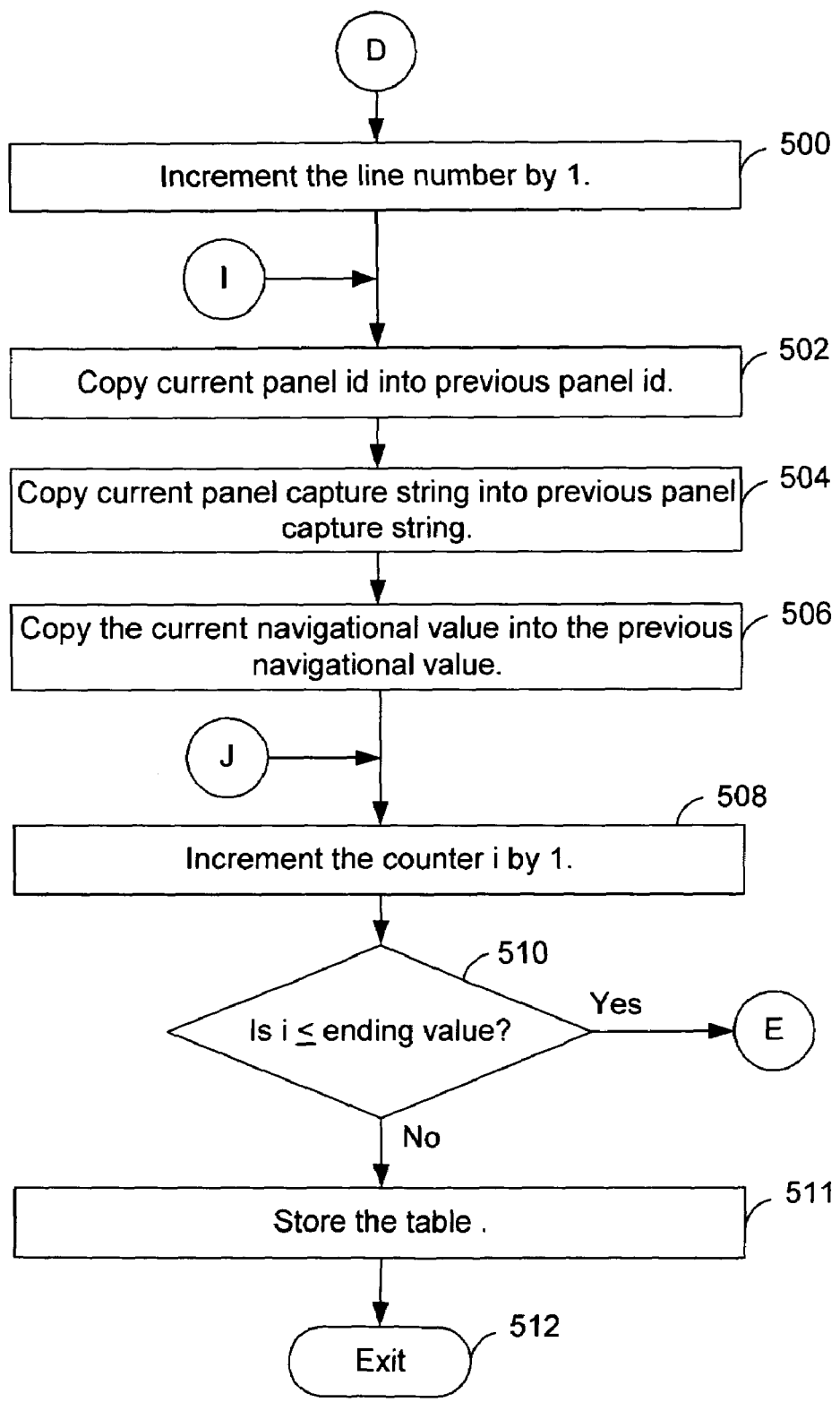

In FIG. 19D, in step 500, the line number is incremented by one. In step 502, the current panel id is copied into the previous panel id. In step 504, the current panel capture string is copied into the previous panel capture string. In step 506, the current navigational value is copied into the previous navigational value. In step 508, the counter i is incremented by one. Step 510 determines whether the value of the counter i is less than or equal to the ending value. When step 510 determines that the value of the counter i is not less than or equal to the ending value, in step 511, the table is stored. The table is an embodiment of the document of FIG. 2. In some embodiments, the table is stored as a file in the specified working directory. In other embodiments, the table is stored as a file in a predetermined directory. In step 512 the build handler 102

(FIG. 2) exits. When step 510 determines that the value of the counter i is less than or equal to the ending value, step 510 proceeds via Continuator E to step 460 of FIG. 19A to process additional captured data.

Figure 19E:
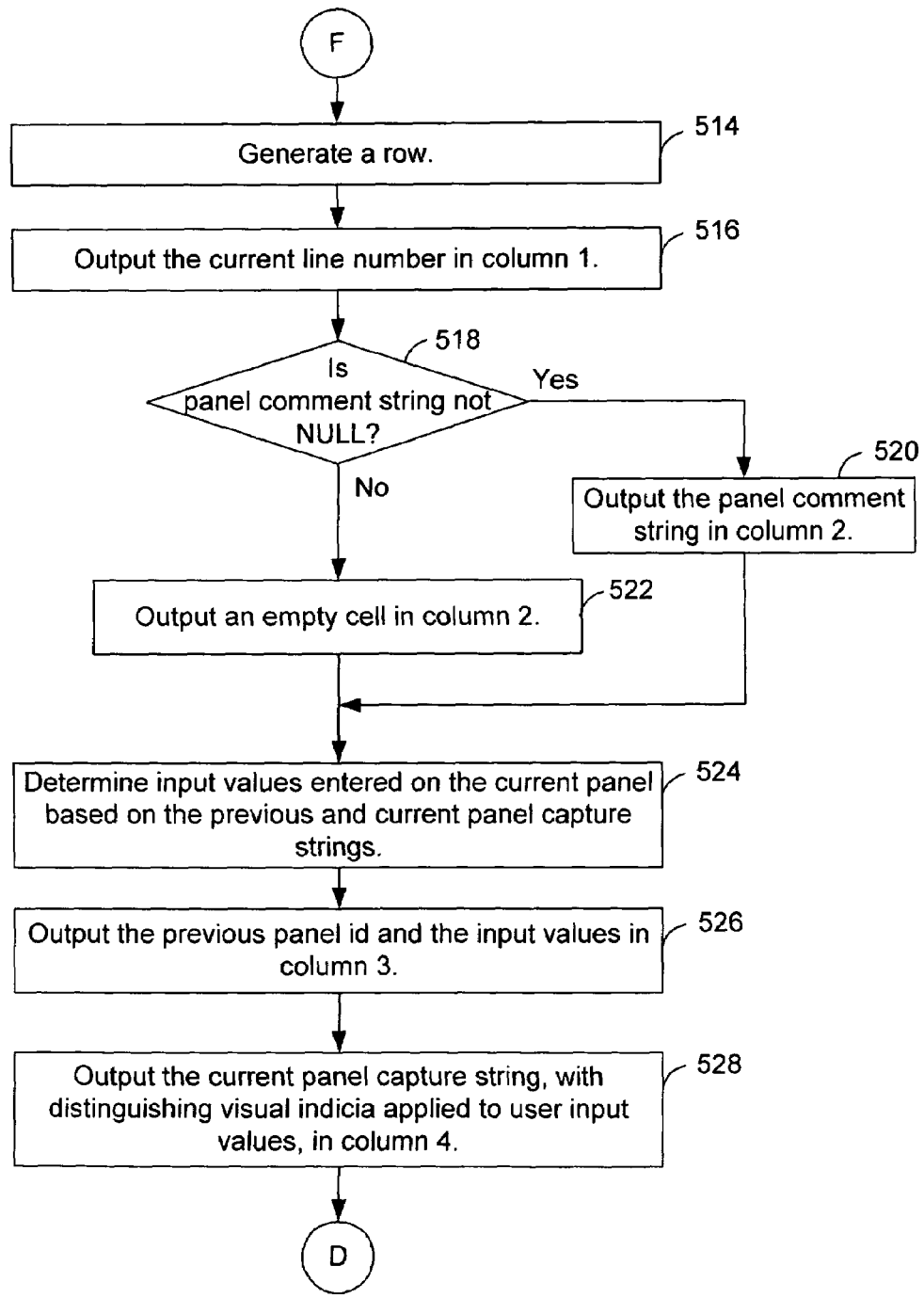

In FIG. 19B, when step 482 determines that the previous panel id is equal to the current panel id and that the previous navigational value is equal to NULL, step 482 proceeds via Continuator F to step 514 of FIG. 19E.

In FIG. 19E, in step 514, another row of the table is generated as a HTML row tag <TR>. In step 516, the current line number is output in column one of the row. Step 518 determines whether the panel comment is not NULL. When step 518 determines that the panel comment is not NULL, in step 520, the panel comment is output in column two of the row and step 520 proceeds to step 524. When step 518 determines that the panel comment is NULL, in step 522, an empty cell is output in column two of the row, and step 522 proceeds to step 524. In step 524, input values entered on the current panel, associated with the current panel capture string, are determined based on the previous and current panel capture strings. In step 526, the previous panel id and the input values are output in column three of the row. In step 528, the current panel capture string, with a distinct visual indicator applied to user input values, is output in column four of the row. In various embodiments, the current panel capture string is formatted using HTML tags. Step 528 proceeds via Continuator D to step 500 of FIG. 19D.

Figure 19F:
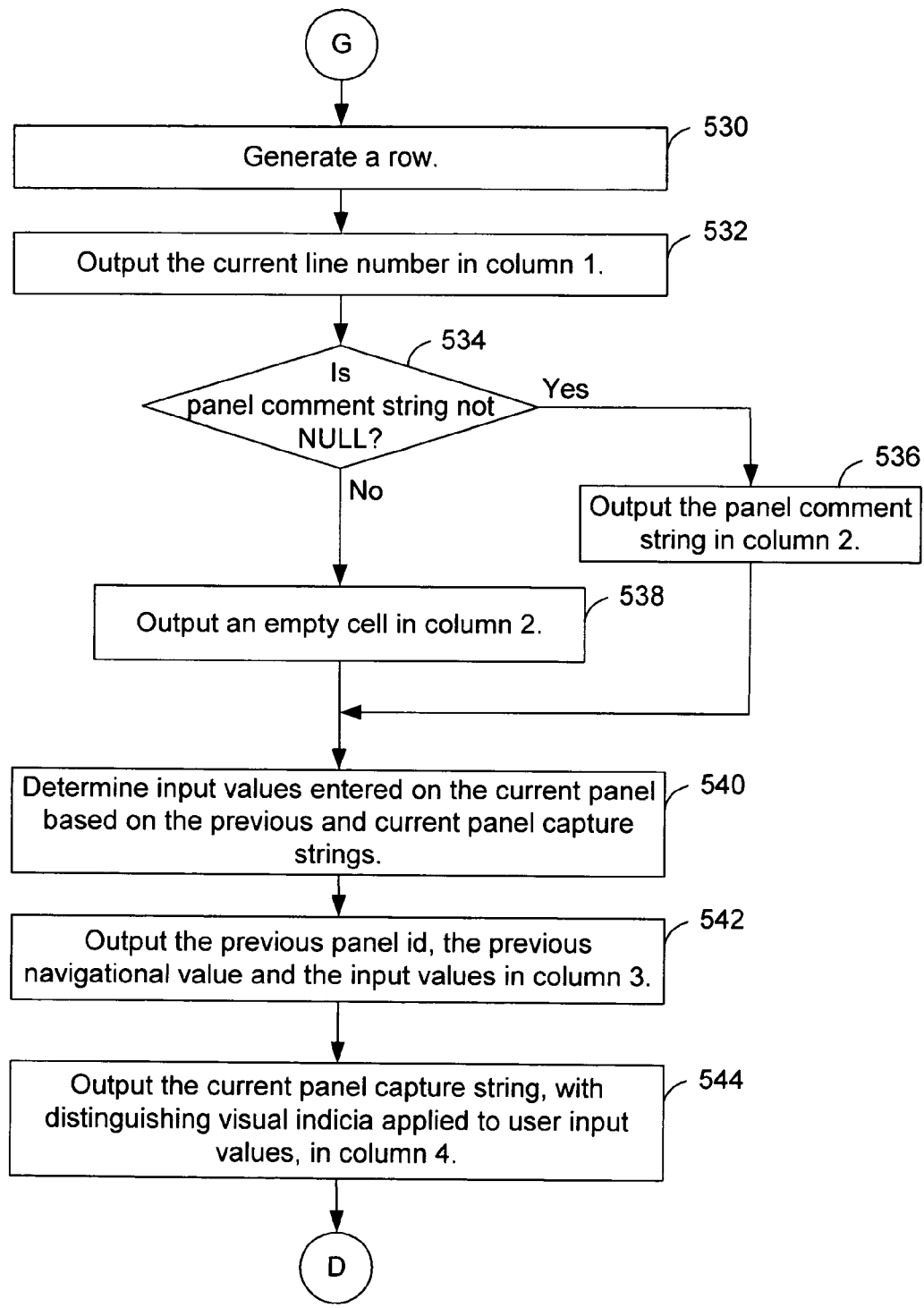

In FIG. 19B, when step 484 determines that the previous panel id is equal to the current panel id and that the previous navigational value is not equal to NULL, step 484 proceeds via Continuator G to step 530 of FIG. 19F.

In FIG. 19F, in step 530, another row of the table is generated as an HTML row tag <TR>. In step 532, the current line number is output in column one of the row. Step 534 determines whether the panel comment string is not NULL. When step 534 determines that the panel comment string is not NULL, in step 536, the panel comment string is output in column two of the row and step 536 proceeds to step 540. When step 534 determines that the panel comment string is NULL, in step 538, an empty cell is output in column two of the row, and step 538 proceeds to step 540. In step 540, input values entered on the current panel, associated with the current panel capture string, are determined based on the previous and current panel capture strings. In step 542, the previous panel id, the previous navigational value and the input values are output in column three of the row. In step 544, the current panel capture string, with a distinct visual indicator applied to user input values, is output in column four of the row. In various embodiments, the current panel capture string is output in a format using HTML tags. Step 544 proceeds via Continuator D to step 500 of FIG. 19D.

Figure 19G:
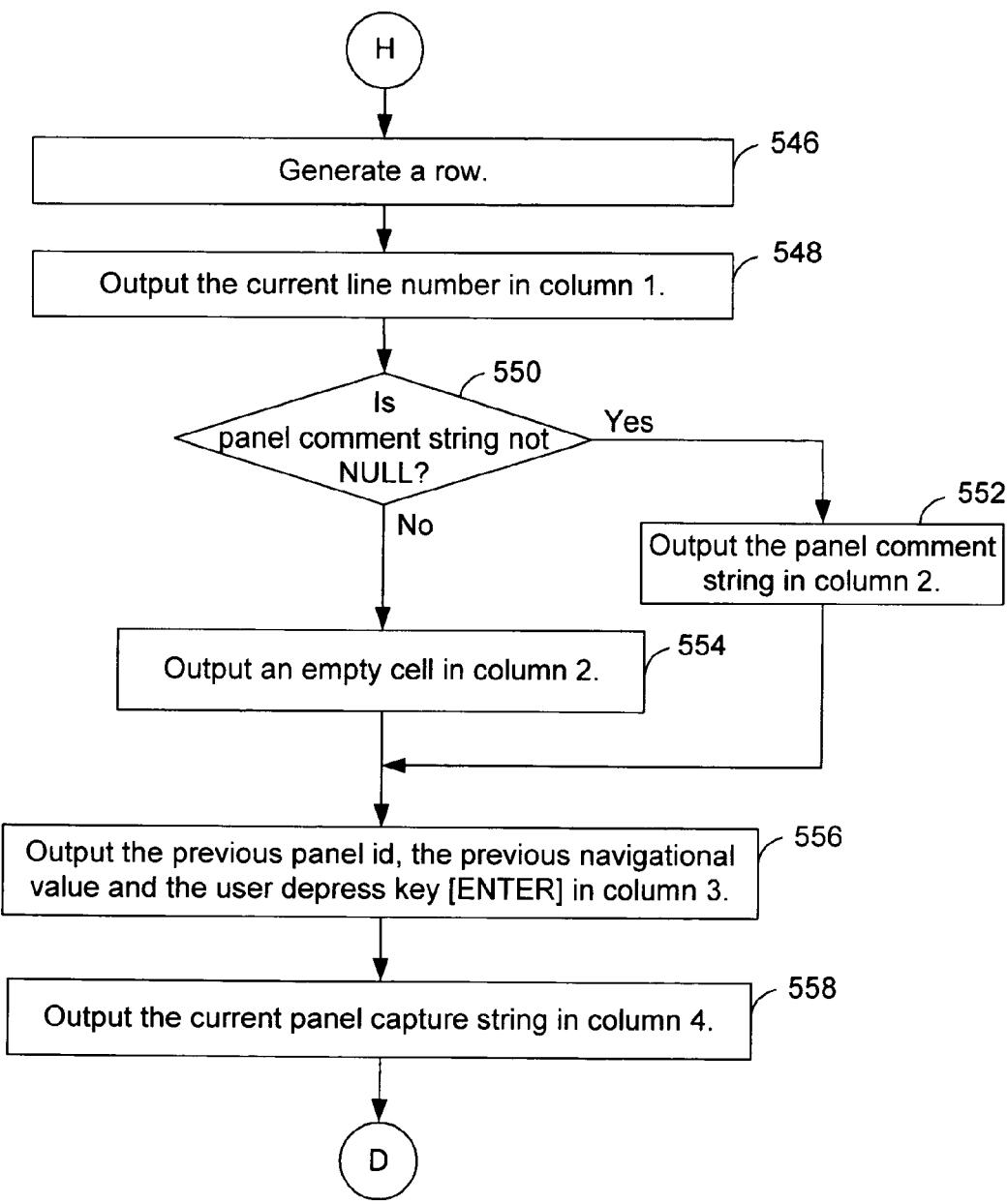

FIG. 19B, when step 484 determines that the previous panel id is not equal to the current panel id or that the previous navigational value is equal to NULL, step 484 proceeds via Continuator H to step 546 of FIG. 19G.

In FIG. 19G, in step 546, another row of the table is generated as a HTML row tag <TR>. In step 548, the current line number is output in column one of the row. Step 550 determines whether the panel comment string is not NULL. When step 550 determines that the panel comment string is not NULL, in step 552, the panel comment string is output in column two of the row and step 552 proceeds to step 556. When step 550 determines that the panel comment string is NULL, in step 554, an empty cell is output in column two of the row, and step 554 proceeds to step 556. In step 556, the previous panel id, the previous navigational value and the user depress key [ENTER] are output in column three of the row.

In step 558, the current panel capture string is output in column four. In various embodiments, the current panel capture string is output in a format using HTML tags. Step 558 proceeds via Continuator D to step 500 of FIG. 19D.

In FIG. 19B, when step 478 determines that the current navigational value is not NULL, step 278 proceeds via Continuator I to step 502 of FIG. 19D.

In FIG. 19A, when step 462 determines that F1 does not exist, step 462 proceeds via Continuator J to step 508 of FIG. 19D.

Figure 20:
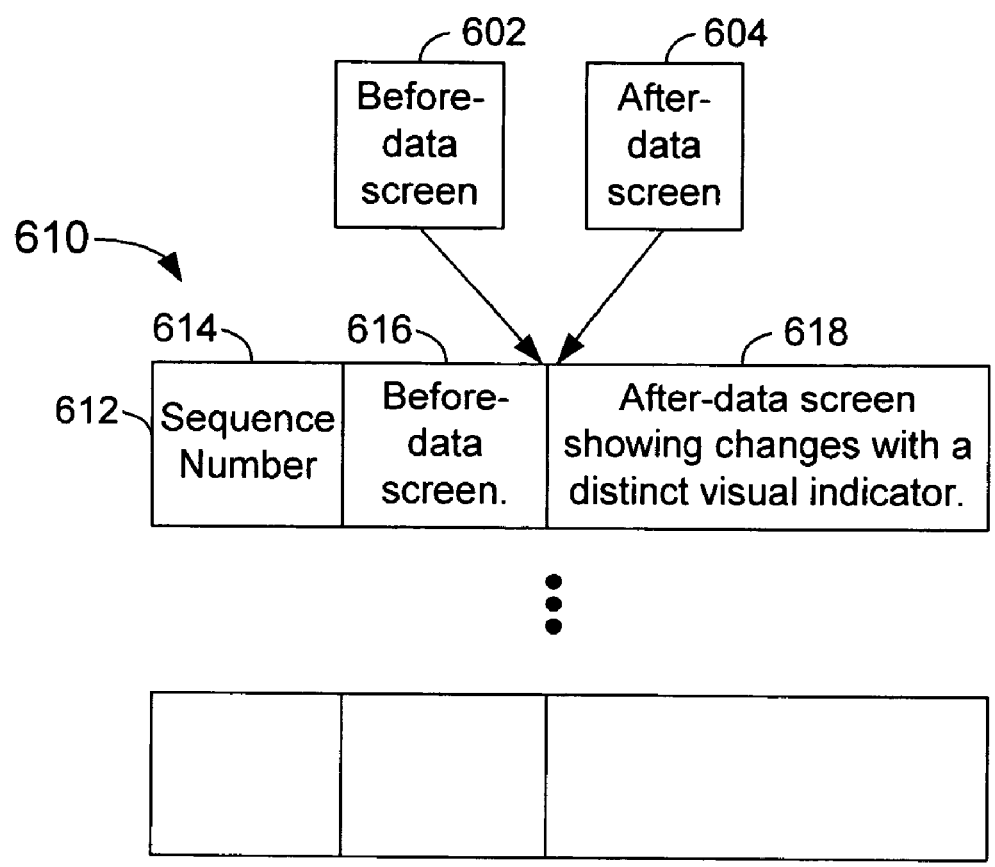
FIG. 20 depicts a block diagram of another embodiment of the document of FIG. 2 for images.

FIG. 20 depicts a block diagram of an embodiment of a document of FIG. 2 for images. The before-data and after-data screens, 602 and 604, respectively, are images, that is, they are copied as bit-mapped data. For example, in some embodiments, when a screen containing buttons or icons is copied, that screen will be copied as bit-mapped data. The document 610 of FIG. 20 is for bit-mapped data and comprises one or more rows 612, the rows comprise a sequence number column 614, a before-data column 616 and an after-data column which showing changes in the after-data screen with a distinct visual indicator 618. The sequence number column is as described above with reference to FIG. 17. In some embodiments, the sequence number is omitted. The before-data column 616 comprises the before-data screen 602. The after-data column 618 comprises the after-data screen 604 with a distinct visual image indicator to indicate the differences with respect to the before-data screen. The before-data and after-data screens are compared bit by bit, and differences between the before-data and after-data screens are indicated, by the distinct visual image indicator, in the after-data screen in the after-data column 618. The distinct visual image indicator comprises at least one and any combination of color, pattern and shading. In some embodiments, the distinct visual indicator comprises animation, such as blinking.

Figures 21, 21A:
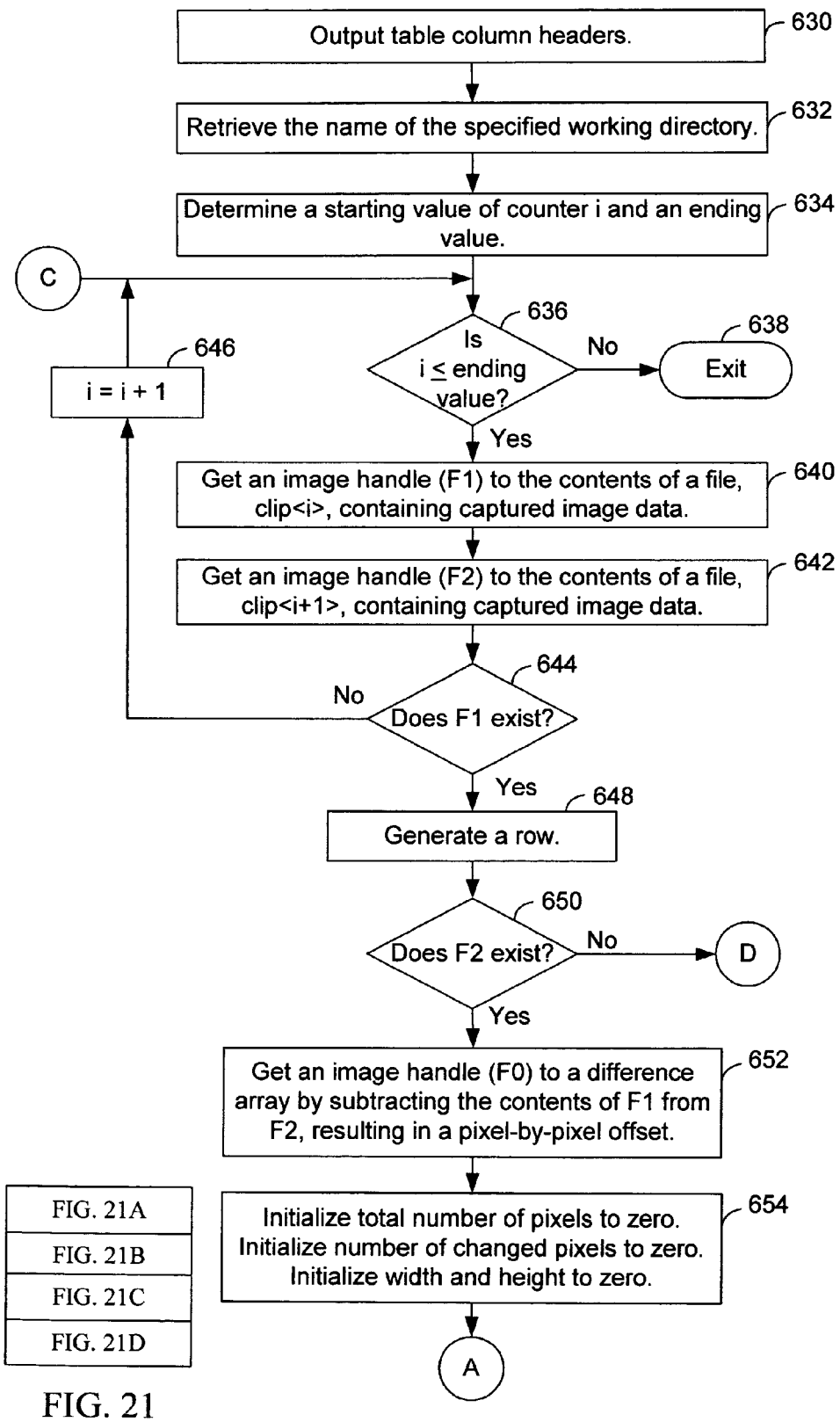
FIG. 21 comprises FIGS. 21A, 21B, 21C and 21D which collectively depict a flowchart of another embodiment of building the document FIG. 2 based on bit-mapped images.

FIG. 21 comprises FIGS. 21A, 21B, 21C and 21D which collectively depict a flowchart of an embodiment of building another embodiment of the document of FIG. 2. The document produced by the flowchart of FIG. 21 comprises bit-mapped image data. In various embodiments, the flowchart of FIG. 21 is implemented in the build handler 102 (FIG. 2).

In step 630, table column headers are output. In some embodiments, the table column headers are "Before-data" and "After-data". In this embodiment, column one is the "Before-data" column and column two is the "After-data" column.

In step 632, the name of the specified working directory is retrieved from the working directory text field of the capture display screen. In step 634, the starting value of a counter called i and ending value are determined as described with respect to step 372 of FIG. 16. Step 636 determines whether the value of counter i is less than or equal to the ending value. When step 636 determines that the value of counter i is not less than or equal to the ending value, in step 637, the table, that is, the document, is stored, and in step 638, the flowchart exits.

When step 636 determines that the value of counter i is less than or equal to the ending value, in step 640, the build handler gets an image handle (F1) to the contents of a file, clip<i>, containing captured image data. The file clip<i> is read into random access memory (RAM). The image handle F 1 is associated with the address of the contents of the file, clip<i>, in RAM. In various embodiments, the image handle F1 is associated with an array that contains the pixel data of the captured image from clip<i>.

In step 642, the build handler gets an image handle (F2) to the contents of a file, clip<i+1>, containing captured image data. The image handle F2 is associated with the address of the contents of the file, clip<i+1>, in RAM. In various embodiments, the image handle F2 is associated with an array that contains the pixel data of the captured image from clip<i+1>.

Step 644 determines whether the image handle F1 exists. When step 644 determines that the image handle F1 does not exist, that is, there is no file clip<i> for that value of i, in step 646, the value of the counter i is incremented by one, and step 646 proceeds to step 636.

When step 644 determines that the image handle F1 exists, in step 648, a row of a table is generated. Step 650 determines whether the image handle F2 exists. When step 650 determines that the image handle F2 exists, in step 652, the build handler gets another image handle (F0) to a difference array by subtracting the contents of the array associated with image handle F1 from the contents of the array associated with image handle F2 which results in the array associated with image handle F0 containing a pixel-by-pixel offset.

In step 654, several variables, a total number of pixels, a number of changed pixels, a width and height, are initialized to zero. The width refers to the number of pixels in a horizontal direction across an image, and the height refers to the number of pixels in a vertical direction of an image. Step 654 proceeds via Continuator A to step 656 of FIG. 21B.

Figure 21B:
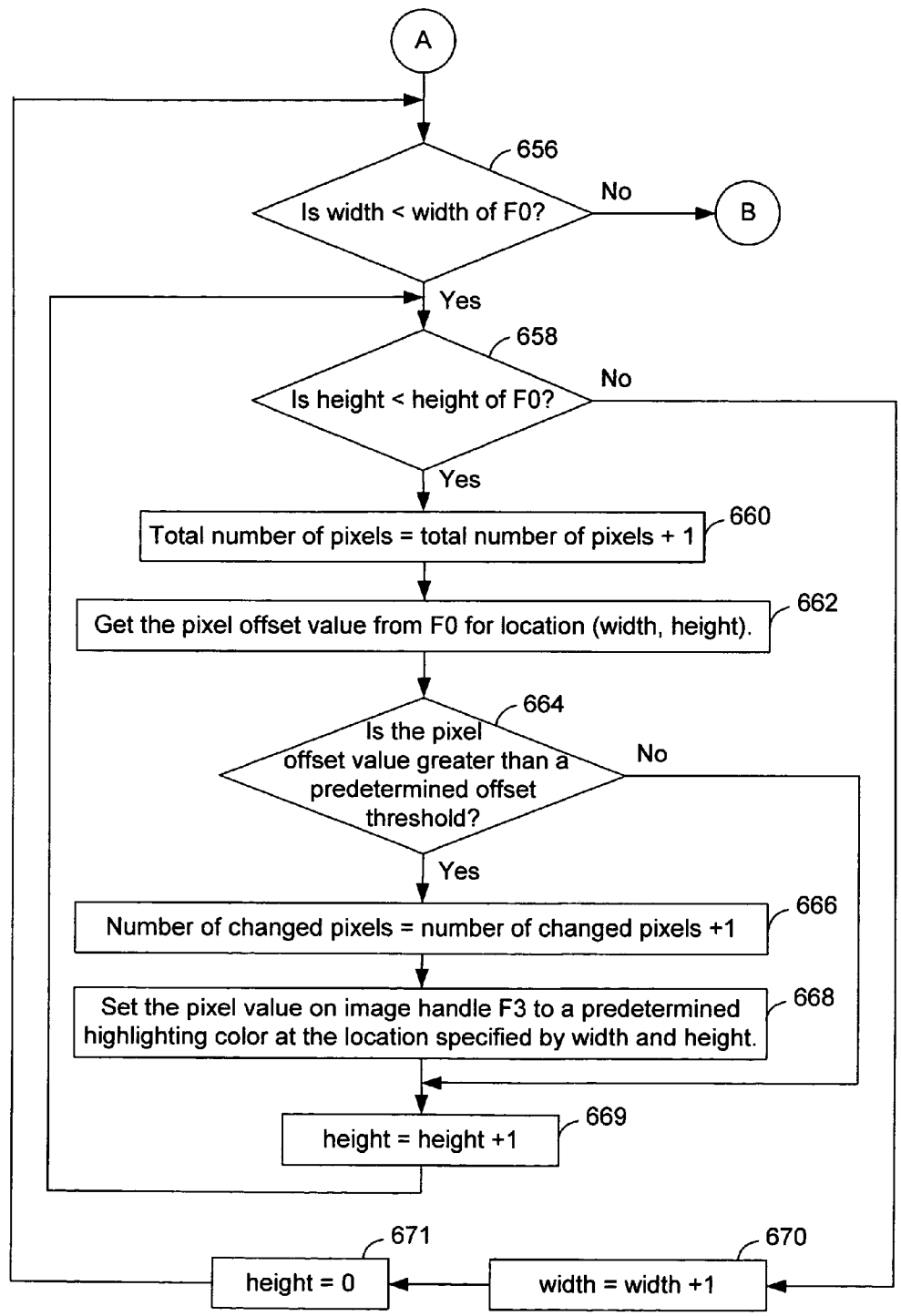

In FIG. 21B, step 656 determines whether the width is less than the width of the image associated with image handle F0. When step 656 determines that the width is less than the width associated with image handle F0, step 658 determines whether the height is less than the height associated with the image handle F0. When step 658 determines that the height is less than the height associated with the image handle F0, in step 660, the total number of pixels is incremented by one. In step 662, the build handler gets the pixel offset value from the image associated with image handle F0 for the location specified by width and height.

Step 664 determines whether the pixel offset value is greater than a predetermined offset threshold. In various embodiments, the predetermined offset threshold is used to determine if the pixel offset value is sufficiently significant such that the associated location should be highlighted as a difference. When step 664 determines that the pixel offset value is greater than the predetermined offset threshold, in step 666, the number of changed pixels is incremented by one. In step 668, the build handler sets the pixel value associated with yet another image handle F3 to a predetermined highlighting color at the location specified by the width and height. In some embodiments, the predetermined highlighting color is yellow. However, the predetermined highlighting color is not meant to be limited to yellow and other colors may be used. In various embodiments, the image handle F3 is associated with another array and indicates the pixels that should be highlighted. In step 669, the value of the height is incremented by one, and step 669 proceeds to step 658. When step 664 determines that the pixel offset value is not greater than the predetermined offset threshold, step 664 proceeds to step 669.

When step 658 determines that the value of height is not less than the height of the image associated with image handle F0, in step 670, the value of width is incremented by one. In step 671, the value of height is set equal to zero, and step 671 proceeds to step 656. When step 656 determines that the width is not less than the width of the image associated with image handle F0, step 656 proceeds via Continuator B to step 672 of FIG. 21C.

Figure 21C:
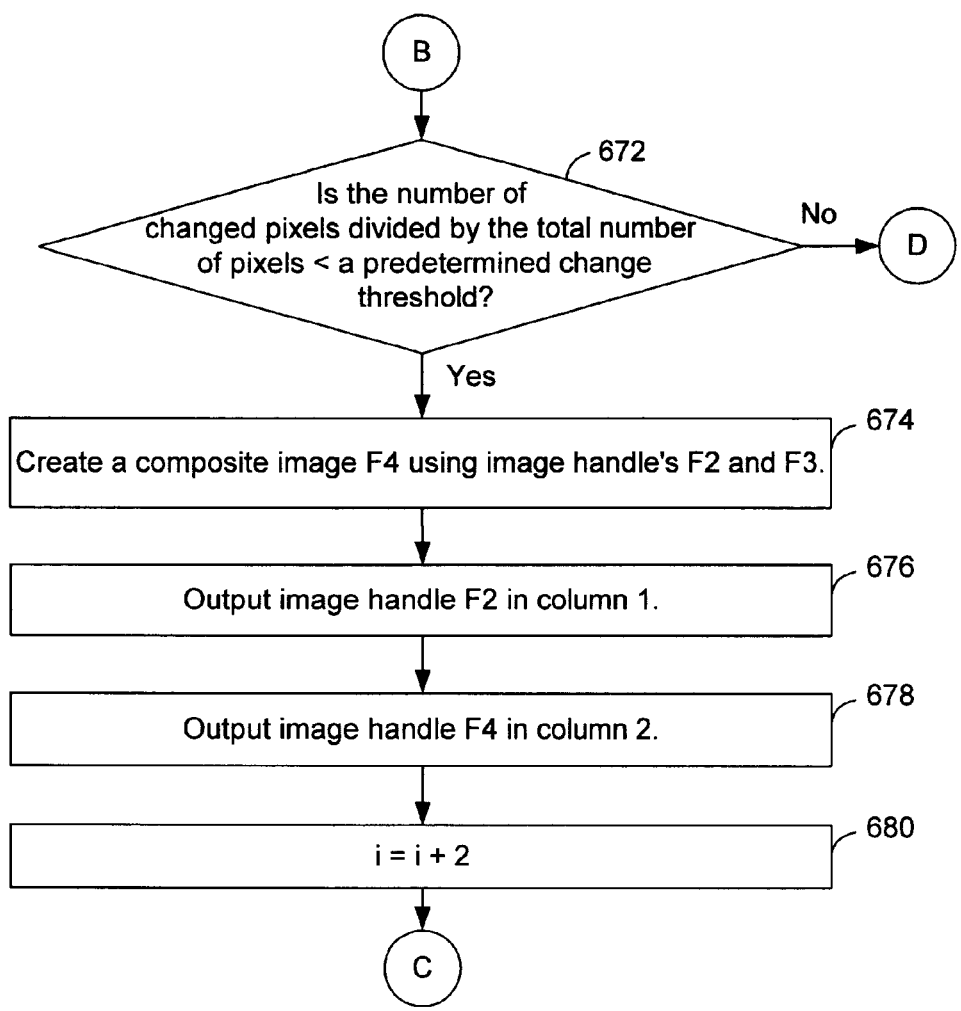

In FIG. 21C, step 672 determines whether the number of changed pixels divided by the total number of pixels is less than a predetermined change threshold. When step 672 determines that the number of changed pixels divided by the total number of pixels is less than the predetermined change threshold, in step 674, a composite image with image handle F4 is created using image handles F2 and F3. In some embodiments, a method in the JAVA Advanced Imaging Application Programming Interface (API) is used to create the composite image with image handle F4 based on image handles F2 and F3. In various embodiments, the composite image contains the image data of the image associated with image handle F2, with highlighting applied to the pixels that are different from the image associated with image handle F1.

In step 676, the image associated with image handle F2 is output in column one of the row. In step 678, the image associated with the image handle F4 is output in column two of the row. In step 680, the value of i is incremented by two and step 680 proceeds via Continuator C to step 636 of FIG. 21A.

Figure 21D:
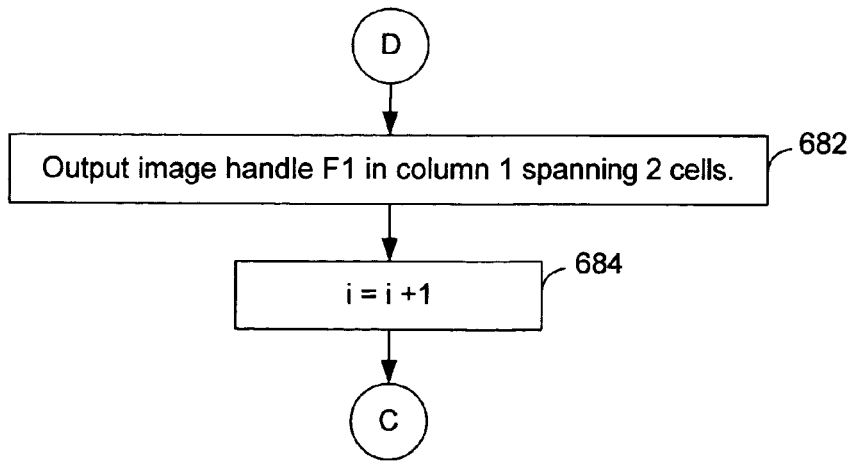

When step 672 determines that the number of changed pixels divided by the total number of pixels is not less than the predetermined change threshold, step 672 proceeds via Continuator D to step 682 of FIG. 21D.

In FIG. 21D in step 682, the image associated with image handle F1 is output in column one spanning two cells of the row. In step 684, the value of counter i is incremented by one, and step 684 proceeds via Continuator C to step 636 of FIG. 21A.

When step 650 of FIG. 21A determines that the image handle F2 does not exist, step 650 proceeds via Continuator D to step 682 of FIG. 21D.

Figure 22:
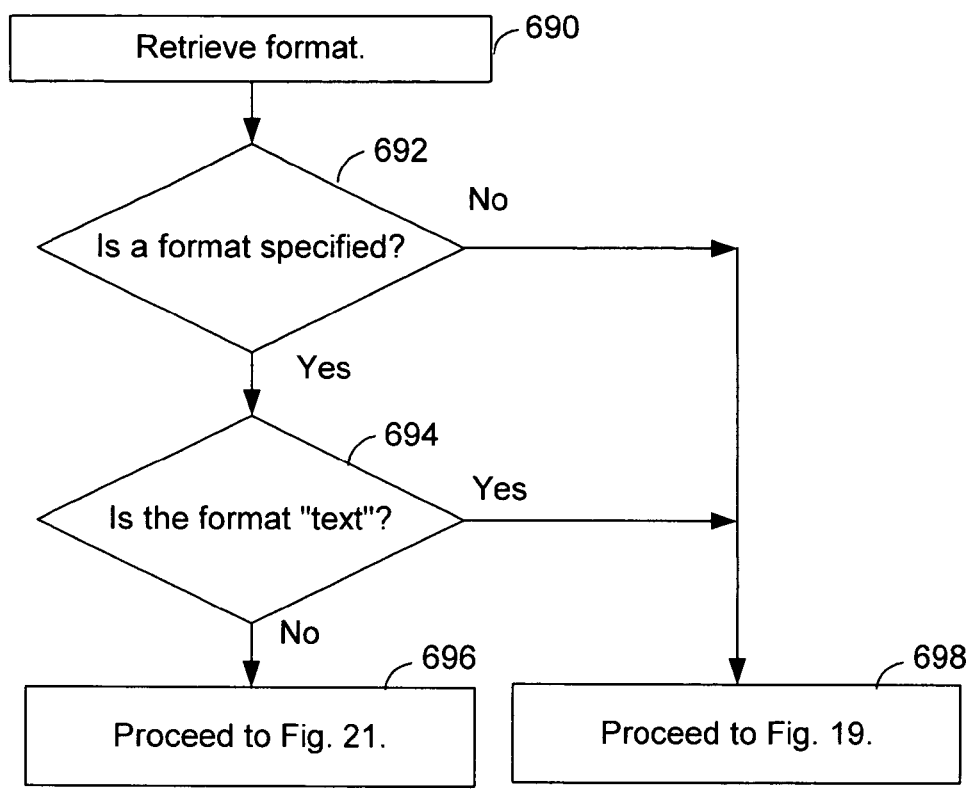
FIG. 22 depicts a flowchart of yet another embodiment of the build handler of FIG. 2 which invokes the flowcharts of FIGS. 19 and 21 based on the format field of the capture display screen of FIG. 3.

FIG. 22 depicts a flowchart of another embodiment of the build handler 102 (FIG. 2) which invokes the flowcharts of FIGS. 19 and 21 based on the format field 90 (FIG. 3) of the capture data screen 90 (FIG. 3). In step 690, the format is retrieved from the format field 146 of FIG. 3. Step 692 determines whether a format is specified. When step 692 determines that the format is specified, step 694 determines whether the format is "text." When step 694 determines that the format is not "text," step 696 proceeds to the flowchart of FIG. 21 to build an image-based document. When step 694 determines that the format is "text," step 696 proceeds to the flowchart of FIG. 19 to build a text-based document. When step 692 determines that no format is specified," step 692 proceeds to the flowchart of FIG. 19 to build a text-based document.

Although the document has been described with respect to various embodiments of a table, the document is not meant to be limited to a table. For example, in various embodiments, the document may be a spreadsheet, a database table, a word processor document, or an extensible mark-up language (XML) document. For example, in yet another embodiment, the document is a video; in this embodiment, if the captured data is image data, each image is a frame in the video.

Various embodiments have been described with respect to a single source application. In some embodiments, at least a portion of one or more screens from a plurality of concurrently executing source applications may be captured to provide the set of captured screens.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A method of capturing a workflow using a computer having a processor, comprising:

causing said computer to automatically store, by a capture application, at least a portion of a copied screen of a source application from a clipboard to a storage medium to provide a captured screen;

causing said computer to repeat said automatically storing, by said capture application, to provide a set of captured screens, said set of captured screens comprising a plurality of particular captured screens, each particular captured screen of said plurality of particular captured screens comprising a plurality of screen rows having a plurality of screen columns; and causing said computer to build a document comprising a plurality of document rows and at least one document column, said at least one document column comprising a first document column, wherein said first document column of a document row of said plurality of document rows comprises said plurality of screen rows having said plurality of screen columns of a particular captured screen of said plurality of particular captured screens, respectively.

2. The method of claim 1 wherein said source application is a workflow application.

3. The method of claim 1 further comprising:

causing said computer to copy at least a portion of a displayed screen of said source application to said clipboard to provide said copied screen.

4. The method of claim 1 wherein said at least one document column comprises a second document column, said second document column comprising a user input.

5. The method of claim 4 further comprising:

causing said computer to identify said user input based on said particular captured screen and a previous captured screen of said set of captured screens.

6. The method of claim 1 wherein said set of captured screens is associated with a software test, and said document provides a record of said software test.

7. The method of claim 1 wherein said building further comprises:

causing said computer to compare said captured screen of said set of captured screens to another captured screen of said set of captured screens; and causing said computer to indicate changes between said captured screen of said set of captured screens and said another captured screen of said set of captured screens in said document.

8. The method of claim 1 further comprising:

causing said computer to determine whether a comment is associated with said copied screen; and causing said computer to, in response to said determining, store said comment such that said comment is associated with said captured screen that is associated with said copied screen, wherein said building also stores said comment in said document.

9. The method of claim 1 wherein said storing stores said copied screen in response to said copied screen being different from a previous captured screen.

10. The method of claim 1 further comprising:

causing said computer to display said captured screen.

11. The method of claim 1 further comprising:

causing said computer to, in response to a play activation, sequentially display at least a subset comprising at least two captured screens of said set of captured screens, wherein one captured screen of said at least two captured screens is displayed for a predetermined amount of time, and in response to said predetermined amount of time elapsing, not display said one captured screen of said at least two captured screens and displaying a next captured screen of said at least two captured screens.

12. The method of claim 1 wherein said captured screens are text-based screens.

13. The method of claim 1 wherein said captured screens are bit-mapped images.

14. The method of claim 1 wherein said at least one document column comprises a second document column comprising a sequence number associated with said particular captured screen.

15. The method of claim 1 wherein said each particular captured screen is a string, said string being in a format that uses mark-up languages tags.

16. A method using a first computer having a first processor and a second computer having a second processor, comprising:

causing said first computer to execute a source application;

causing said second computer to display, by a first application, a first displayed screen;

causing said second computer to execute a capture application, said capture application displaying a graphical user interface comprising a first graphical control and a second graphical control;

causing said second computer to first receive a selection of at least a portion of said first displayed screen of said source application from a user;

causing said second computer to, in response to a command from said user, first copy said at least a portion of said first displayed screen of said source application to said clipboard thereby providing a first copied screen;

causing said second computer to receive an activation of said first graphical control from said user;

causing said second computer to, in response to said first graphical control being activated, first automatically store said at least a portion of said first copied screen from a clipboard to a storage device thereby providing a first captured screen, wherein said first captured screen comprises a first plurality of first screen rows having a first plurality of first screen columns, each first screen row of said first plurality of first screen rows being adjacent to at least one other first screen row of said first plurality of first screen rows, each first screen column of said first plurality of first screen columns being adjacent to at least one other first screen column of said first plurality of first screen columns, wherein said first captured screen is a text-based screen;

causing said second computer to provide a user input to said source application using said first displayed screen;

causing said first computer to, in response to said user input, display by said source application a second displayed screen;

causing said second computer to second receive a selection of at least a portion of said second displayed screen of said source application from said user;

causing said second computer to, in response to another command from said user, second copy said at least a portion of said second displayed screen of said source application to said clipboard thereby providing a second copied screen;

causing said second computer to, in response to said first graphical control being activated, second automatically store said at least a portion of said second copied screen from said clipboard to said storage device thereby providing a second captured screen, wherein said second captured screen comprises a second plurality of second screen rows having a second plurality of second screen columns, each second screen row of said second plurality of second screen rows being adjacent to at least one other second screen row of said second plurality of second screen rows, each second screen column of said second plurality of second screen columns being adjacent to at least one other second screen column of said second plurality of second screen columns, wherein said second captured screen is another text-based screen;

causing said second computer to, in response to said second graphical control being activated, build a table based on said first captured screen and said second captured screen, said table comprising a plurality of table rows and at least one table column, said plurality of table rows comprising a first table row and a second table row, said at least one table column comprising a first table column, said first table column of said first table row comprising said first plurality of first screen rows having said first plurality of first screen columns of said first captured screen, said first table column of said second table row comprising said second plurality of second screen rows having said second plurality of second screen columns of said second captured screen; and causing said second computer to store said table in a file.

17. The method of claim 16 wherein said at least one table column comprises a second table column, said second table column of said second table row comprising said user input.

18. The method of claim 17 wherein said at least one table column comprises a third table column, said third table column comprising a sequence number indicating an order of said first captured screen and said second captured screen.

19. The method of claim 16 wherein said command from said user comprises simultaneously pressing a ctrl key and a C key, wherein said another command from said user comprises simultaneously pressing said ctrl key and said C key.

20. A method for transforming a digital computer with accessible memory to a specialized machine, the method comprising:

instantiating first computer instructions into said memory, the first instructions configured to automatically store at least a portion of a copied screen of a source application from a clipboard to a storage medium to provide a captured screen;

instantiating second computer instructions into said memory, the second instructions configured to repeat said automatically storing, to provide a set of captured screens, said set of captured screens comprising a plurality of particular captured screens, each particular captured screen of said plurality of particular captured screens comprising a plurality of screen rows having a plurality of screen columns; and instantiating third computer instructions into said memory, the third instructions configured to build a document comprising a plurality of document rows and at least one document column, said at least one document column comprising a first document column, wherein said first document column of a document row of said plurality of document rows comprises said plurality of screen rows having said plurality of screen columns of a particular captured screen of said plurality of particular captured screens, respectively.

21. A computer program product for capturing a workflow, the computer program product comprising:

a computer readable storage medium;

first program instructions to automatically store, by a capture application, at least a portion of a copied screen of a source application from a clipboard to a memory to provide a captured screen;

second program instructions to repeat said first program instructions to automatically store, by said capture application, to provide a set of captured screens, said set of captured screens comprising a plurality of particular captured screens, each particular captured screen of said plurality of particular captured screens comprising a plurality of screen rows having a plurality of screen columns; and third program instructions to build a document comprising a plurality of document rows and at least one document column, said at least one document column comprising a first document column, wherein said first document column of a document row of said plurality of document rows comprises said plurality of screen rows having said plurality of screen columns of a particular captured screen of said plurality of particular captured screens, respectively;

wherein said first, second and third program instructions are stored on said computer readable storage medium.

22. The computer program product of claim 21 wherein said source application is a workflow application.

23. The computer program product of claim 21 further comprising:

fourth program instructions to copy at least a portion of a displayed screen of said source application to said clipboard to provide said copied screen;

wherein said fourth program instructions are stored on said computer readable storage medium.

24. The computer program product of claim 21 wherein said at least one document column comprises a second document column, said second document column comprising a user input.

25. The computer program product of claim 24 further comprising:

fourth program instructions to identify said user input based on said particular captured screen and a previous captured screen of said set of captured screens;

wherein said fourth program instructions are stored on said computer readable storage medium.

26. The computer program product of claim 21 wherein said set of captured screens is associated with a software test, and said document provides a record of said software test.

27. The computer program product of claim 21 wherein said third program instructions to build comprises:

fourth program instructions to compare said captured screen of said set of captured screens to another captured screen of said set of captured screens; and fifth program instructions to indicate changes between said captured screen of said set of captured screens and said another captured screen of said set of captured screens in said document;

wherein said fourth and fifth program instructions are stored on said computer readable storage medium.

28. The computer program product of claim 21 further comprising:

fourth program instructions to determine whether a comment is associated with said copied screen; and fifth program instructions to, in response to said determining, store said comment such that said comment is associated with said captured screen that is associated with said copied screen, wherein said third program instructions to build also stores said comment in said document;

wherein said fourth and fifth program instructions are stored on said computer readable storage medium.

29. The computer program product of claim 21 wherein said first program instructions to store stores said copied screen in response to said copied screen being different from a previous captured screen.

30. The computer program product of claim 21 further comprising:

fourth program instructions to display said captured screen;

wherein said fourth program instructions are stored on said computer readable storage medium.

31. The computer program product of claim 21 further comprising:

fourth program instructions to, in response to a play activation, sequentially display at least a subset comprising at least two captured screens of said set of captured screens, wherein one captured screen of said at least two captured screens is displayed for a predetermined amount of time, and in response to said predetermined amount of time elapsing, not display said one captured screen of said at least two captured screens and display a next captured screen of said at least two captured screens;

wherein said fourth program instructions are stored on said computer readable storage medium.

32. The computer program product of claim 21 wherein said captured screens are text-based screens.

33. The computer program product of claim 21 wherein said captured screens are bit-mapped images.

34. The computer program product of claim 21 wherein said at least one document column comprises a second document column comprising a sequence number associated with said particular captured screen.

35. The computer program product of claim 21 wherein said each particular captured screen is a string, said string being in a format that uses mark-up language tags.

36. A system comprising:

a processor;

a memory storing instructions, executable by said processor, said instructions to:

automatically store, by a capture application, at least a portion of a copied screen of a source application from a clipboard to a storage medium to provide a captured screen;

repeat said automatically store, by said capture application, to provide a set of captured screens, said set of captured screens comprising a plurality of particular captured screens, each particular captured screen of said plurality of particular captured screens comprising a plurality of screen rows having a plurality of screen columns; and build a document comprising a plurality of document rows and at least one document column, said at least one document column comprising a first document column, wherein said first document column of a document row of said plurality of document rows comprises said plurality of screen rows having said plurality of screen columns of a particular captured screen of said plurality of particular captured screens, respectively.

37. The system of claim 36 wherein said source application is a workflow application.

38. The system of claim 36, said instructions to:

copy at least a portion of a displayed screen of said source application to said clipboard to provide said copied screen.

39. The system of claim 36 wherein said at least one document column comprises a second document column, said second document column comprising a user input.

40. The system of claim 39, said instructions to:

identify said user input based on said particular captured screen and a previous captured screen of said set of captured screens.

41. The system of claim 36 wherein said set of captured screens is associated with a software test, and said document provides a record of said software test.

42. The system of claim 36 wherein said instructions to build:

compares said captured screen of said set of captured screens to another captured screen of said set of captured screens; and indicates changes between said captured screen of said set of captured screens and said another captured screen of said set of captured screens in said document.

43. The system of claim 36, said instructions to:

determine whether a comment is associated with said copied screen; and in response to said determine, store said comment such that said comment is associated with said captured screen that is associated with said copied screen, wherein said build also stores said comment in said document.

44. The system of claim 36 wherein said instructions to store stores said copied screen in response to said copied screen being different from a previous captured screen.

45. The system of claim 36, said instructions to:

display said captured screen.

46. The system of claim 36, said instructions to:

in response to a play activation, sequentially display at least a subset comprising at least two captured screens of said set of captured screens, wherein one captured screen of said at least two captured screens is displayed for a predetermined amount of time, and in response to said predetermined amount of time elapsing, not display said one captured screen of said at least two captured screens and display a next captured screen of said at least two captured screens.

47. The system of claim 36 wherein said captured screens are text-based screens.

48. The system of claim 36 wherein said captured screens are bit-mapped images.

49. The system of claim 36 wherein said at least one document column comprises a second document column comprising a sequence number associated with said particular captured screen.

50. The system of claim 36 wherein said each particular captured screen is a string, said string being in a format that uses mark-up language tags.

* * * * *

UNITED STATES PATENT AND TRADEMARK OFFICE
CERTIFICATE OF CORRECTION

PATENT NO. : 7,594,183 B2
APPLICATION NO. : 10/917922
DATED : September 22, 2009
INVENTOR(S) : Brian Scott Dreher Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Twenty-eighth Day of September, 2010

David J. Kappos
*Director of the United States Patent and Trademark Office*